US012181835B2

(12) United States Patent
Nishikawa et al.

(10) Patent No.: US 12,181,835 B2
(45) Date of Patent: Dec. 31, 2024

(54) ELECTROPHOTOGRAPHIC DEVELOPER SET COMPRISING TONER AND POWDER ADHESIVE, AND METHOD FOR PRODUCING BONDED PRODUCT

(71) Applicant: CANON KABUSHIKI KAISHA, Tokyo (JP)

(72) Inventors: Koji Nishikawa, Shizuoka (JP); Tsutomu Shimano, Shizuoka (JP); Yuhei Terui, Shizuoka (JP); Shohei Yamashita, Tokyo (JP); Kohei Matsuda, Kanagawa (JP); Yuki Nishizawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 652 days.

(21) Appl. No.: 17/385,127

(22) Filed: Jul. 26, 2021

(65) Prior Publication Data

US 2022/0035262 A1 Feb. 3, 2022

(30) Foreign Application Priority Data

Jul. 31, 2020 (JP) .................................. 2020-130346

(51) Int. Cl.
*G03G 9/097* (2006.01)
*C09J 9/00* (2006.01)
(Continued)

(52) U.S. Cl.
CPC ............ *G03G 9/09733* (2013.01); *C09J 9/00* (2013.01); *C09J 167/02* (2013.01);
(Continued)

(58) Field of Classification Search
CPC ... G03G 9/0825; G03G 9/08782; G03G 13/08
See application file for complete search history.

(56) References Cited

U.S. PATENT DOCUMENTS 7,260,354 B2  8/2007  Ishida
9,377,705 B2  6/2016  Shimano et al.
(Continued)

FOREIGN PATENT DOCUMENTS

JP  2006-171607 A   6/2006
JP  2010-079106  *  4/2010 ............... G03G 9/09
(Continued)

OTHER PUBLICATIONS

Translation of JP 2010-079106.*
(Continued)

*Primary Examiner* — Peter L Vajda
(74) *Attorney, Agent, or Firm* — Venable LLP

(57) ABSTRACT

An electrophotographic developer set comprising a toner, and a powder adhesive, wherein the powder adhesive comprises a crystalline polyester resin, and a thermoplastic resin other than the crystalline polyester resin; the amount of the crystalline polyester resin in the powder adhesive is 21% by mass or more; the melting point of the crystalline polyester resin is 55° C. to 100° C.; in a viscoelasticity measurement, where Gt'(100) denotes a storage elastic modulus of the toner at 100° C. and Gb'(100) denotes a storage elastic modulus of the powder adhesive at 100° C., Gb'(100) is $1.0 \times 10^5$ Pa or less and Gt'(100)/Gb'(100) is 1.2 or more.

13 Claims, 11 Drawing Sheets

(51) Int. Cl.
*C09J 167/02* (2006.01)
*G03G 9/08* (2006.01)

(52) U.S. Cl.
CPC ......... *G03G 9/0819* (2013.01); *G03G 9/0821* (2013.01); *G03G 9/0827* (2013.01); *G03G 9/09725* (2013.01)

(56) References Cited

U.S. PATENT DOCUMENTS

| | | |
|---|---|---|
| 9,857,711 B2 | 1/2018 | Yoshida et al. |
| 10,416,582 B2 | 9/2019 | Nakagawa et al. |
| 10,437,165 B2 | 10/2019 | Shimano et al. |
| 10,877,390 B2 | 12/2020 | Shimano et al. |
| 2020/0183294 A1 | 6/2020 | Fukudome et al. |

FOREIGN PATENT DOCUMENTS

| | | |
|---|---|---|
| JP | 2013-130794 A | 7/2013 |
| JP | 2014-139618 A | 7/2014 |
| JP | 2014-153661 A | 8/2014 |

OTHER PUBLICATIONS

U.S. Appl. No. 17/385,118, filed Jul. 26, 2021, Terui et al.
U.S. Appl. No. 17/385,137, filed Jul. 26, 2021, Yamashita et al.
U.S. Appl. No. 17/385,147, filed Jul. 26, 2021, Shimano et al.

\* cited by examiner

ELECTROPHOTOGRAPHIC DEVELOPER SET COMPRISING TONER AND POWDER ADHESIVE, AND METHOD FOR PRODUCING BONDED PRODUCT

BACKGROUND OF THE INVENTION

Field of the Invention

The present disclosure relates to an electrophotographic developer set including a toner and a powder adhesive functioning as an adhesive, and with which an electrostatic latent image is developed on a recording material by using an electrophotographic system, to form a toner image and an adhesive portion by the powder adhesive. The present disclosure also relates to a method for producing a bonded product by using the above electrophotographic developer set.

Description of the Related Art

Conventionally, when making a paper bag on which different information is printed for each individual with a printer or a copier, a method of setting a pre-made paper bag in the printer or copier and printing on the paper bag has been used. The resulting problem arising when performing printing on a paper bag and on plain paper at the same time is that it takes time and effort to change the paper used in the printer from the paper bag to plain paper every time the print target is changed, or printing is performed on a wrong print target.

To address the above problems, a method has been proposed in which, in addition to image formation with colored toner by using an electrophotographic system, an adhesive portion derived from a pigment-free powder adhesive is also formed for paper bonding. A further method has been proposed in which printing on plain paper in accordance with the above method is simultaneously accompanied by processing of the plain paper into a paper bag. A toner set of a colored toner and a powder adhesive used in the method has been proposed.

In addition, a set of a colored toner and a transparent toner aimed at imparting a three-dimensional appearance, glossy feel, and graininess has likewise been proposed in applications other than adhesives.

Japanese Patent Application Publication No. 2006-171607 proposes an image forming method for forming an image and an adhesive portion by using an adhesive toner such that a lower limit temperature of an appropriate fixing temperature of the adhesive toner is lower than that of a toner used for image formation.

Japanese Patent Application Publication No. 2013-130794 proposes a toner set in which a layer of transparent toner is formed on an image formed of a colored toner, to visually make it appear three-dimensional.

Japanese Patent Application Publication No. 2014-139618 proposes a toner set in which the glossy feel of the entire image is controlled by a transparent toner.

Japanese Patent Application Publication No. 2014-153661 proposes a toner set in which the graininess of a solid image is controlled with a transparent toner.

SUMMARY OF THE INVENTION

In the method described in Japanese Patent Application Publication No. 2006-171607, it is disclosed that by using an adhesive toner that a lower limit temperature of an appropriate fixing temperature of the adhesive toner is lower than that of a toner used for image formation, it is possible to melt the adhesive toner at a temperature at which the toner used for image formation is not melted.

However, in this method, it was found that sufficient adhesive strength may not be obtained when an toner image portion of a toner is formed on paper, an adhesive portion made of a powder adhesive is formed on the back surface of the image portion, the paper is stacked with the adhesive portion on the inner side, and the adhesive portion is melted to form a paper bag.

In addition, it was found that when the adhesive portion is heated and melted at a high temperature in order to obtain adhesive strength, a phenomenon (hot offset) may occur in which the image portion melts and a part of the image portion is transferred to a fixing unit, and it is difficult to achieve both adhesive strength and hot offset resistance.

Meanwhile, since each of the toner sets disclosed in Japanese Patent Application Publication No. 2013-130794, Japanese Patent Application Publication No. 2014-139618, and Japanese Patent Application Publication No. 2014-153661 is intended to form a three-dimensional appearance, glossy feel, and graininess by a transparent toner, respectively, where the transparent toner is used as a powder adhesive, there is a problem that it is difficult to achieve both sufficient adhesive strength and hot offset resistance of colored toner.

The present disclosure provides an electrophotographic developer set comprising a toner and a powder adhesive, the set being excellent hot offset resistance and sufficient adhesive strength, and a method for producing a bonded product using the electrophotographic developer set.

An electrophotographic developer set comprising
    a toner, and
    a powder adhesive,
wherein
    the powder adhesive comprises
        a crystalline polyester resin, and
        a thermoplastic resin other than the crystalline polyester resin;
    the amount of the crystalline polyester resin in the powder adhesive is 21% by mass or more;
    the melting point of the crystalline polyester resin is 55° C. to 100° C.;
    in a viscoelasticity measurement,
    where Gt'(100) denotes a storage elastic modulus of the toner at 100° C. and
    Gb'(100) denotes a storage elastic modulus of the powder adhesive at 100° C.,
    Gb'(100) is $1.0 \times 10^5$ Pa or less and
    Gt'(100)/Gb'(100) is 1.2 or more.

According to the present disclosure, an electrophotographic developer set that includes a toner and a powder adhesive, the set being excellent in hot offset resistance and affording sufficient adhesive strength, and a method for producing a bonded product using the electrophotographic developer set can be provided. Further features of the present invention will become apparent from the following description of exemplary embodiments with reference to the attached drawings.

DESCRIPTION OF THE EMBODIMENTS

Figure 1:
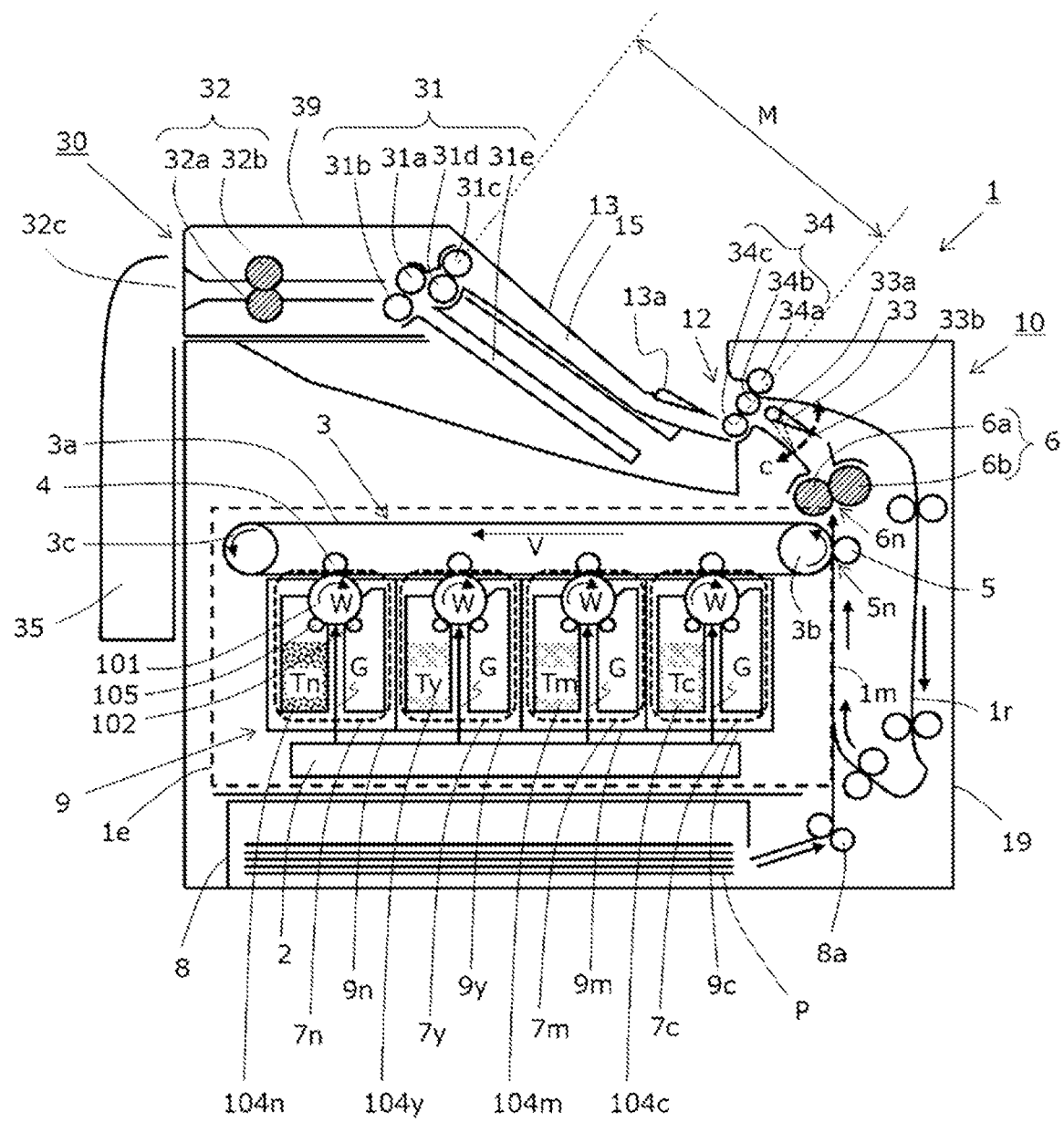
FIG. 1 is a schematic drawing of an image forming apparatus.

In the present disclosure, the notations "from XX to YY" and "XX to YY" representing a numerical range denote, unless otherwise stated, a numerical value range that includes the lower limit and the upper limit thereof, as endpoints.

In a case where numerical value ranges are described in stages, the upper limits and the lower limits of the respective numerical value ranges can be combined arbitrarily.

Further, methods for measuring physical properties will be described hereinbelow.

First, an example of a method for producing a paper bag by an electrophotographic system using an electrophotographic developer set including the above toner and powder adhesive will be described hereinbelow.

Initially, using the electrophotographic system, a toner image portion of toner is formed on paper (forming step of the toner image portion). Subsequently, the toner image portion is fixed to the paper by heating (fixing step of the toner image portion). Next, an adhesive portion by a powder adhesive is formed on the back surface of the paper having the toner image portion formed thereon (forming step of the adhesive portion). Subsequently, the adhesive portion is fixed on the paper by heating (fixing step of the adhesive portion). After that, the paper is laid up, in an overlapping fashion, so as to sandwich the adhesive portion, with further heating, to thereby elicit bonding (bonding step) through melting of the adhesive portion, and yield a paper bag (deliverable).

It is important to increase the adhesive strength between the powder adhesive and the paper in order to prevent the adhesive portion from peeling off even if an article is put in the deliverable, but at the same time it is necessary to prevent the hot offset of the toner image portion.

Here, the present inventors have conducted diligent investigation under an assumption that it is important to control the melt viscosity of the powder adhesive and the toner in order to achieve sufficient adhesive strength of the adhesive portion in the bonding step and at the same time prevent hot offset of the toner image portion.

The present disclosure relates to an electrophotographic developer set comprising
a toner, and
a powder adhesive,
wherein
the powder adhesive comprises
a crystalline polyester resin, and
a thermoplastic resin other than the crystalline polyester resin;

the amount of the crystalline polyester resin in the powder adhesive is 21% by mass or more;
the melting point of the crystalline polyester resin is 55° C. to 100° C.;
in a viscoelasticity measurement,
where $Gt'(100)$ denotes a storage elastic modulus of the toner at 100° C. and $Gb'(100)$ denotes a storage elastic modulus of the powder adhesive at 100° C.,
$Gb'(100)$ is $1.0 \times 10^5$ Pa or less and
$Gt'(100)/Gb'(100)$ is 1.2 or more.

By controlling the physical properties of the developer set within the above ranges, it is possible to achieve both sufficient adhesive strength and offset resistance. The present inventors considered the following reasons therefor.

The adhesive portion in the bonding step cannot receive heat directly from the fixing unit because there is paper between the adhesive portion and the fixing unit. Therefore, it is necessary to design the powder adhesive to have a viscosity that allows the powder adhesive to be sufficiently melted even if the heat of the fixing unit is partially blocked by paper.

Furthermore, in order for the powder adhesive to exert sufficient adhesive strength, it is important not only to form the adhesive portion of the powder adhesive as an image on the paper, but also to use a design such that the powder adhesive enters the paper fibers at the time of melting. When the melted powder adhesive enters the paper fibers and hardens, the so-called anchor effect is exerted and the adhesive strength can be increased. That is, in order to obtain the adhesive strength, it is important to quickly reduce the viscosity at the time of melting and introduce the adhesive into the paper fibers.

The powder adhesive includes a crystalline polyester resin and a thermoplastic resin other than the crystalline polyester resin (hereinafter, also simply referred to as "thermoplastic resin"). The crystalline polyester resin has a sharp melt property and can be quickly melted even when passing through a fixing unit. Further, the molten crystalline polyester resin can be mixed with the thermoplastic resin to reduce the melt viscosity of the thermoplastic resin.

Furthermore, since the crystalline polyester resin has ester bonds of polar groups in the molecular structure, excellent compatibility with paper is achieved. Therefore, the melted powder adhesive easily enters the paper fibers due to the capillary phenomenon.

The amount of the crystalline polyester resin in the powder adhesive is 21% by mass or more. The amount is preferably from 25% by mass to 40% by mass. By setting the amount to 21% by mass or more, the powder adhesive can be melted in a short time at the time of fixing to lower the viscosity. As a result of lowering the viscosity, the adhesive easily enters the paper fibers, and the adhesive strength can be increased.

The melting point of the crystalline polyester resin contained in the powder adhesive is from 55° C. to 100° C. The melting point is preferably from 55° C. to 90° C. By setting the melting point of the crystalline polyester resin in the above range, the viscosity can be lowered even with a small amount of heat, so that the adhesive can easily enter the paper fibers and the adhesive strength can be increased.

In the viscoelasticity measurement of the powder adhesive, assuming that the storage elastic modulus of the powder adhesive at 100° C. is $Gb'(100)$, $Gb'(100)$ is $1.0 \times 10^5$ Pa or less. $Gb'(100)$ is preferably $1.0 \times 10^4$ Pa or less. The lower limit is not particularly limited, but is preferably $1.0 \times 10$ Pa or more, and more preferably $1.0 \times 10^2$ Pa or more.

The powder adhesive needs to be designed to have a viscosity that allows it to melt even if the heat of the fixing unit is partially blocked by paper, and it was found that not only the viscosity at the time of melting but also the storage elastic modulus at 100° C. is important to obtain the adhesive strength. The storage elastic modulus is an index of susceptibility to deformation, and the smaller the value thereof, the more difficult it is to return to the original shape after deformation.

Where $Gb'(100)$ is $1.0 \times 10^5$ Pa or less, the powder adhesive melted by heat is deformed when subjected to pressure and can enter the paper fibers, so that sufficient adhesive strength is obtained.

While the powder adhesive achieves sufficient adhesive strength, it is necessary to suppress the occurrence of hot offset of the toner image portion formed on the front side of the paper bag. There is no shielding object between the toner image portion and the fixing unit, and the toner image portion receives heat directly. Therefore, if the toner is deformed too much by heat and pressure, a part of the toner is transferred to the fixing unit, and a hot offset occurs.

Assuming that the storage elastic modulus of the toner at 100° C. is $Gt'(100)$ in the viscoelasticity measurement of the toner, it is important to set the $Gt'(100)$ of the toner with respect to the $Gb'(100)$, which is an index of powder adhesive deformation caused by the heat and pressure of the fixing unit, in the range where the deformation does not proceed too much due to the heat and pressure of the fixing unit.

As a result of diligent studies by the present inventors, it was found that where $Gt'(100)/Gb'(100)$ is 1.2 or more, it is possible to achieve both sufficient adhesive strength of the powder adhesive and hot offset resistance of the toner. $Gt'(100)/Gb'(100)$ is preferably from 2.0 to 30.0, and more preferably from 5.0 to 25.0.

$Gb'(100)$ and $Gt'(100)$ can be controlled by the type and amount ratio of the thermoplastic resin or crystalline polyester contained in the powder adhesive and the toner.

$Gt'(100)$ is preferably from $5.0 \times 10^3$ Pa to $1.0 \times 10^5$ Pa, and more preferably from $2.0 \times 10^4$ Pa to $6.0 \times 10^4$ Pa.

In order to further improve the adhesive strength of the powder adhesive and the hot offset resistance of the toner, it is preferable to control the temperature relationship at which the storage elastic modulus $Gb'$ of the powder adhesive and the storage elastic modulus $Gt'$ of the toner are $1.0 \times 10^4$ Pa.

Where the storage elastic modulus $Gb'$ of the powder adhesive is $1.0 \times 10^4$ Pa, the deformation progresses due to the heat and pressure of the fixing unit, the powder adhesive enters the paper fibers, and the adhesive strength can be obtained. Meanwhile, where the storage elastic modulus $Gt'$ of the toner is $1.0 \times 10^4$ Pa, a hot offset is unlikely to occur. The temperature when the storage elastic modulus of the powder adhesive and the toner is $1.0 \times 10^4$ Pa is a guideline for further improving the adhesive strength of the powder adhesive and the hot offset resistance of the toner.

Since the toner receives heat directly from the fixing unit, it is ideal that the storage elastic modulus $Gt'$ of the toner be $1.0 \times 10^4$ Pa at a temperature higher than that of the powder adhesive. In the viscoelasticity measurement, assuming that the temperature at which the storage elastic modulus $Gb'$ of the powder adhesive is $1.0 \times 10^4$ Pa is Tb, and the temperature at which the storage elastic modulus $Gt'$ of the toner is $1.0 \times 10^4$ Pa is Tt, Tt−Tb is preferably 10° C. or higher, and more preferably 15° C. or higher.

By setting Tt−Tb to 10° C. or higher, it becomes easy to achieve both sufficient adhesive strength of the powder adhesive and hot offset resistance of the toner. The upper limit is not particularly limited, but Tt−Tb is preferably 35° C. or lower, and more preferably 30° C. or lower.

Tb and Tt can be controlled by the type and amount ratio of the thermoplastic resin or the crystalline polyester resin contained in the powder adhesive and the toner.

In the viscoelasticity measurement of the powder adhesive, the maximum value of the ratio (tan δ) of the loss elastic modulus G″ of the powder adhesive to the storage elastic modulus G′ of the powder adhesive in the range of 55° C. to 100° C. is less than 3.0. More preferably, the maximum value is from 0.7 to 2.0.

tan δ is an index showing the stickiness of the powder adhesive at the time of melting; the smaller the index, the closer the powder adhesive to an elastic body, and the larger the index, the closer the powder adhesive to a viscous body.

Where the maximum value of tan δ is less than 3.0, the powder adhesive in the molten state behaves like an elastic body. Therefore, even if two paper sheets become misaligned when passing through the fixing unit, the powder adhesive in the molten state returns to the original shape, so that the misalignment between the paper sheets can be eliminated and the occurrence of wrinkles can be suppressed.

tan δ can be controlled by the type and amount ratio of the thermoplastic resin, crystalline polyester resin and wax contained in the powder adhesive.

The powder adhesive includes a thermoplastic resin other than the crystalline polyester resin. The thermoplastic resin contained in the powder adhesive is not particularly limited and can be exemplified by well-known thermoplastic resins such as polyester resins, vinyl resins, acrylic resins, styrene acrylic resins, polyethylene, polypropylene, polyolefins, ethylene-vinyl acetate copolymer resin, ethylene-acrylic acid copolymer resins, and the like.

Further, the toner may include the above-mentioned thermoplastic resin.

The toner and the powder adhesive may include a plurality of these resins. Further, the thermoplastic resin contained in the toner and the powder adhesive may be the same or different.

The thermoplastic resin other than the crystalline polyester resin contained in the powder adhesive preferably includes an amorphous resin. The thermoplastic resin other than the crystalline polyester resin preferably includes an amorphous polyester resin as a main component. The main component is a component with an amount of 50% by mass or more.

Further, the toner preferably includes an amorphous resin as the thermoplastic resin, and more preferably includes an amorphous polyester resin.

The amount of the amorphous polyester resin in the thermoplastic resin is preferably from 50% by mass to 100% by mass, more preferably from 80% by mass to 100% by mass, and further preferably from 90% by mass to 100% by mass.

The amorphous polyester resin and the crystalline polyester resin both have a polar group ester bond in the molecular structure, so they have high affinity and are likely to be compatible at the time of melting. Therefore, the crystalline polyester resin is unlikely to separate from the amorphous polyester resin when the powder adhesive is melted. Therefore, it is possible to suppress the exudation of the separated crystalline polyester resin to the paper surface opposite that of the adhesive surface causes by the permeation of the resin through the paper.

Further, the content ratio of the thermoplastic resin other than the crystalline polyester resin in the powder adhesive is preferably from 40% by mass to 80% by mass, and more preferably from 50% by mass to 65% by mass.

A known polyester resin can be used as the amorphous polyester resin.

Specific examples include dibasic acids and derivatives thereof (carboxylic acid halides, esters, and acid anhydrides) and condensed polymers of dihydric alcohols. If necessary, trivalent or higher polybasic acids and derivatives thereof (carboxylic acid halides, esters, and acid anhydrides), monobasic acids, trihydric or higher alcohols, and monohydric alcohols may be used.

Examples of the dibasic acid include aliphatic dibasic acids such as maleic acid, fumaric acid, itaconic acid, oxalic acid, malonic acid, succinic acid, dodecylsuccinic acid, dodecenylsuccinic acid, adipic acid, azelaic acid, sebacic acid, decane-1,10-dicarboxylic acid, and the like; aromatic dibasic acids such as phthalic acid, tetrahydrophthalic acid, hexahydrophthalic acid, tetrabromophthalic acid, tetrachlorophthalic acid, chlorendic acid, himic acid, isophthalic acid, terephthalic acid, 2,6-naphthalenedicarboxylic acid, and the like; and the like.

Examples of the dibasic acid derivatives include carboxylic acid halides, esters and acid anhydrides of the above-mentioned aliphatic dibasic acid and aromatic dibasic acid.

Meanwhile, examples of the dihydric alcohol include acyclic aliphatic diols such as ethylene glycol, 1,2-propanediol, 1,3-propanediol, 1,4-butanediol, 1,5-pentanediol, 1,6-hexanediol, diethylene glycol, dipropylene glycol, triethylene glycol, neopentyl glycol, and the like; bisphenols such as bisphenol A, bisphenol F, and the like; alkylene oxide adducts of bisphenol A such as bisphenol A ethylene oxide adduct, bisphenol A propylene oxide adduct, and the like; aralkylene glycols such as xylylene diglycol and the like; and the like.

Examples of the trivalent or higher polybasic acid and anhydrides thereof include trimellitic acid, trimellitic anhydride, pyromellitic acid, pyromellitic anhydride, and the like.

Examples of the polymerizable monomer capable of forming the styrene-acrylic resin include styrene-based monomers such as styrene, α-methylstyrene, and divinylbenzene; unsaturated carboxylic acid esters such as methyl acrylate, butyl acrylate, methyl methacrylate, and 2-hydroxyethyl methacrylate, t-butyl methacrylate, and 2-ethylhexyl methacrylate; unsaturated carboxylic acids such as acrylic acid and methacrylic acid; unsaturated dicarboxylic acids such as maleic acid; unsaturated dicarboxylic acid anhydrides such as maleic anhydride; nitrile vinyl monomers such as acrylonitrile; halogen-containing vinyl monomers such as vinyl chloride; nitrovinyl monomers such as nitrostyrene; and the like. These can be used alone or in combination of two or more.

The number average molecular weight Mn of the thermoplastic resin is preferably from 5,000 to 50,000, and more preferably from 10,000 to 40,000.

The weight average molecular weight Mw of the thermoplastic resin is preferably from 20,000 to 200,000, and more preferably from 50,000 to 150,000.

The glass transition temperature Tg of the thermoplastic resin is preferably from 40° C. to 90° C., and more preferably from 50° C. to 65° C.

A known crystalline polyester resin can be used as the crystalline polyester resin contained in the powder adhesive. A crystalline resin is a resin that exhibits a clear melting point as measured by a differential scanning calorimeter (DSC).

The crystalline polyester resin is preferably a polycondensation polymer of a monomer including an aliphatic diol and/or an aliphatic dicarboxylic acid.

The crystalline polyester resin preferably has a structure derived from an aliphatic diol having from 2 to 12 (preferably from 2 to 10) carbon atoms and/or a structure derived from an aliphatic dicarboxylic acid having from 2 to 12 (preferably 2 to 10) carbon atoms. The crystalline polyester resin is more preferably a polycondensation polymer of an aliphatic diol having from 2 to 12 (preferably 2 to 10) carbon atoms and an aliphatic dicarboxylic acid having from 2 to 12 (preferably 2 to 10) carbon atoms.

The crystalline polyester resin having such a structure has molecules arranged regularly and has excellent sharp melt property, so that the crystalline polyester resin can be melted quickly at the time of fixing. The effect of reducing the viscosity of the thermoplastic resin is also exerted.

Since some thermoplastic resins have hydrogen bonds between the constituent molecules thereof, the thermoplastic resin itself cannot be sufficiently reduced in viscosity even when melted. The crystalline polyester resin having the above-mentioned structure easily enters between the molecules of the thermoplastic resin at the time of melting, acts to weaken the hydrogen bonds in the thermoplastic resin, and is effective in reducing the viscosity of the powder adhesive.

Furthermore, the polarity created by the ester group of the crystalline polyester resin works favorably in terms of compatibility with paper. Due to these characteristics, the molten powder adhesive easily penetrates into the fibers of the paper by the capillary phenomenon, and the adhesive strength can be increased.

Examples of the aliphatic diol having from 2 to 12 carbon atoms include the following compounds.

1,2-Ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol.

Alternatively, an aliphatic diol having a double bond can be used. Examples of the aliphatic diol having a double bond include the following compounds.

2-Butene-1,4-diol, 3-hexene-1,6-diol, and 4-octene-1,8-diol.

Examples of the aliphatic dicarboxylic acid having from 2 to 12 carbon atoms include the following compounds.

Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, and 1,12-dodecanedicarboxylic acid. Lower alkyl esters and acid anhydrides of these aliphatic dicarboxylic acids can also be used. These may be used alone or in combination of two or more.

A method for producing the crystalline polyester resin is not particularly limited, and the crystalline polyester resin can be produced by a general polyester polymerization method in which a dicarboxylic acid component and a diol component are reacted. For example, the crystalline polyester resin can be produced by using a direct polycondensation method or a transesterification method, depending on the type of monomer.

The crystalline polyester resin contained in the powder adhesive preferably has a number average molecular weight Mn of from 6.200 to 20,000. Where the molecular weight Mn is in this range, the viscosity at the time of mixing the molten crystalline polyester resin with the thermoplastic resin can be appropriately controlled. Therefore, when the powder adhesive passes through the fixing unit, misalignment between the paper sheets can be prevented and the occurrence of wrinkles in the paper can be prevented.

The toner preferably includes a crystalline polyester resin. The crystalline polyester resin used for the toner may be selected from those exemplified as the crystalline polyester resin used for the powder adhesive.

In order to achieve both the adhesive strength of the powder adhesive and the hot offset resistance of the toner, it is preferable that the amount of the crystalline polyester resin in the toner be smaller than the amount of the crystalline polyester resin in the powder adhesive.

The amount of the crystalline polyester resin in the toner is preferably from 2% by mass to 25% by mass, and more preferably from 5% by mass to 20% by mass.

The toner and the powder adhesive may include a colorant. Examples of the colorant include a black colorant, a yellow colorant, a magenta colorant, and a cyan colorant.

The black colorant is exemplified by carbon black.

Examples of the yellow colorant include yellow pigments represented by monoazo compounds; disazo compounds; condensed azo compounds; isoindolinone compounds; isoindoline compounds; benzimidazolone compounds; anthraquinone compounds; azo metal complexes; methine compounds; allylamide compounds, and the like. Specific examples include C. I. Pigment Yellow 74, 93, 95, 109, 111, 128, 155, 174, 180, 185, and the like.

Examples of the magenta colorant include magenta pigments represented by monoazo compounds; condensed azo compounds; diketopyrrolopyrrole compounds; anthraquinone compounds; quinacridone compounds; basic dye lake compounds; naphthol compounds; benzimidazolone compounds; thioindigo compounds; perylene compounds, and the like. Specific examples include C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, and 269, C. I. Pigment Violet 19 and the like.

Examples of the cyan colorant include cyan pigments represented by copper phthalocyanine compounds and derivatives thereof; anthraquinone compounds; basic dye lake compounds, and the like. Specific examples include C. I. Pigment Blue 1, 7, 15, 15:1, 15:2, 15:3, 15:4, 60, 62, and 66.

Further, various dyes conventionally known as colorants can be used together with the pigment.

The amount of the colorant in the toner is preferably from 1.0% by mass to 20.0% by mass.

Further, the powder adhesive preferably includes a colorant. The amount of the colorant in the powder adhesive is preferably more than 0.00% by mass and 1.00% by mass or less, more preferably from 0.01% by mass to 0.50% by mass, and even more preferably from 0.02% by mass to 0.10% by mass. By including a colorant in the powder adhesive, it is possible to suppress curling of the deliverable obtained by bonding paper sheets at the time of fixing.

The curling is generated by the deformation of the adhesive portion when the deliverable cools after passing through the fixing unit. The crystalline polyester resin in the powder adhesive is preferably present in a finely dispersed state in the powder adhesive particles. Even when the powder adhesive is melted, the crystalline polyester resin can easily and advantageously maintain a finely dispersed state with the fine particles of the colorant as nuclei.

Therefore, where the colorant fine particles are present in the powder adhesive particles, the finely dispersed state of the crystalline polyester resin at the time of melting is easily maintained, so that shrinkage is less likely to occur at the time of curing and the occurrence of curling is likely to be suppressed.

The powder adhesive preferably includes a polyvalent metal compound. The polyvalent metal compound is preferably at least one selected from the group consisting of aluminum compounds, iron compounds, and magnesium compounds.

Examples of the polyvalent metal compound to be used in the powder adhesive include inorganic metal salts and divalent or higher valent metal complexes. Examples of the inorganic metal salt include metal salts such as sodium chloride, calcium chloride, calcium nitrate, barium chloride, magnesium chloride, magnesium sulfate, zinc chloride, aluminum chloride, aluminum sulfate, iron chloride, and the like, and inorganic metal salt polymers such as polyaluminum chloride, polyaluminum hydroxide, calcium polysulfide, and the like.

It is more preferable that the polyvalent metal compound be at least one selected from the group consisting of aluminum chloride, iron chloride, magnesium chloride, and sodium chloride.

The polyvalent metal compound has an ionic bond, and the metal element is biased toward positive charging. Meanwhile, in the crystalline polyester resin, the carbonyl group in the ester group is biased toward negative charging. As a result, the metal element portion of the polyvalent metal compound and the carbonyl group of the crystalline polyester resin are attracted to each other.

The crystalline polyester resin of the powder adhesive may separate from the thermoplastic resin at the time of melting, but the presence of the polyvalent metal compound can suppress the separation of the crystalline polyester resin. Therefore, it is possible to suppress the exudation of the crystalline polyester resin to the back side of the paper due to the permeation of the crystalline polyester resin separated from the thermoplastic resin into the paper.

The amount of the polyvalent metal compound in the powder adhesive is preferably from 0.01% by mass to 1.0% by mass. The amount of the polyvalent metal compound can be controlled by the amount of the polyvalent metal compound added to the powder adhesive and the production conditions of the powder adhesive.

The toner or powder adhesive may include known materials such as wax, charge control agent, charge control resin, pigment dispersant, and the like, if necessary.

A method for producing the toner and the powder adhesive will be explained hereinbelow. Known means can be used to manufacture the toner particles and the powder adhesive particles, and a kneading and pulverizing method or a wet production method can be used. From the viewpoint of uniform particle diameter and shape controllability, a wet production method can be preferably used. Further, examples of the wet production method include a suspension polymerization method, a dissolution suspension method, an emulsion polymerization and aggregation method, and an emulsion aggregation method, and the emulsion aggregation method can be preferably used.

In the emulsification aggregation method, first, fine particles of a binder resin and, if necessary, fine particles of other materials such as a colorant are dispersed and mixed in an aqueous medium. A dispersion stabilizer or a surfactant may be added to the aqueous medium. Then, by adding a flocculant, the fine particles are aggregated until the desired particle diameter is obtained, and then or at the same time, the resin fine particles are fused together. Further, if necessary, the toner particles and the powder adhesive particles are formed by controlling the shape by heat.

Here, the fine particles of the binder resin may be configured as composite particles formed of a plurality of layers constituted by two or more layers made of resins having different compositions. For example, such particles can be produced by an emulsification polymerization method, a miniemulsion polymerization method, a phase inversion emulsification method, or the like, or can be produced by combining several production methods.

When an internal additive is included in toner particles and powder adhesive particles, the internal additive may be contained in the resin fine particles, or it is possible to prepare separately a dispersion liquid of the internal additive fine particles consisting of only the internal additive and aggregate the internal additive fine particles when aggregating the resin fine particles. Further, it is also possible to produce toner particles and powder adhesive particles consisting of layers having different compositions by adding and aggregating resin fine particles having different compositions at different times during aggregation.

The following can be used as the dispersion stabilizer. Examples of the inorganic dispersion stabilizer include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica, and alumina.

Examples of the organic dispersion stabilizer include polyvinyl alcohol, gelatin, methyl cellulose, methyl hydroxypropyl cellulose, ethyl cellulose, sodium salt of carboxymethyl cellulose, and starch.

As the surfactant, known cationic surfactants, anionic surfactants, and nonionic surfactants can be used.

Specific examples of the cationic surfactants include dodecyl ammonium bromide, dodecyl trimethyl ammonium bromide, dodecyl pyridinium chloride, dodecyl pyridinium bromide, hexadecyl trimethyl ammonium bromide, and the like. Specific examples of the nonionic surfactants include dodecyl polyoxyethylene ether, hexadecyl polyoxyethylene ether, nonylphenyl polyoxyethylene ether, lauryl polyoxyethylene ether, sorbitan monooleate polyoxyethylene ether, styrylphenyl polyoxyethylene ether, monodecanoyl sucrose, and the like.

The anionic surfactants can be exemplified by aliphatic soaps such as sodium stearate, sodium laurate, and the like, sodium lauryl sulfate, sodium dodecylbenzenesulfonate, polyoxyethylene (2) sodium lauryl ether sulfate, and the like.

Examples of the flocculant include inorganic metal salts and divalent or higher polyvalent metal compounds. Further, when a surfactant is used as an auxiliary agent in the fine particle dispersion liquid, it is also effective to use a surfactant having the opposite polarity. In particular, when a polyvalent metal compound is used as the flocculant, the amount of the surfactant used is reduced and charging characteristics are improved.

Examples of the inorganic metal salts include metal salts such as sodium chloride, calcium chloride, calcium nitrate, barium chloride, magnesium chloride, magnesium sulfate, zinc chloride, aluminum chloride, aluminum sulfate, iron chloride, and the like, and inorganic metal salt polymers such as polyaluminum chloride, polyaluminum hydroxide, calcium polysulfide, and the like.

If necessary, an external additive or the like may be mixed with the toner particles or the powder adhesive and bonded to the surface thereof.

The powder adhesive preferably comprises inorganic fine particles A on the surface thereof. The inorganic fine particles A are preferably silica fine particles. The silica fine particles are not particularly limited, and known silica such as sol-gel silica can be used. The number average diameter of the primary particles of the inorganic fine particles A is preferably from 30 nm to 200 nm, and more preferably from 40 nm to 190 nm. When the powder adhesive has such inorganic fine particles A on the surface, it is possible to suppress curling of the deliverable obtained by bonding paper sheets at the time of fixing.

When the powder adhesive having the inorganic fine particles A on the surface passes through the fixing unit, the inorganic fine particles A are dispersed in the adhesive portion. Where the inorganic fine particles A are dispersed in a resin such as a thermoplastic resin or a crystalline polyester resin, the filler effect makes it difficult to deform elastically and curling of the deliverable can be suppressed.

Furthermore, where the powder adhesive has the inorganic fine particles A on the surface thereof, it is also effective in improving the adhesive strength. The crystalline polyester resin in the powder adhesive is present in the powder adhesive particles in a finely dispersed state.

When the powder adhesive is melted, the crystalline polyester resin in the finely dispersed state can easily maintain the finely dispersed state with the inorganic fine particles A as a core. As a result, the viscosity of the entire thermoplastic resin in the powder adhesive can be uniformly reduced, it becomes easier for the entire thermoplastic resin to enter the paper fibers, and the adhesive strength is improved.

The amount of the inorganic fine particles A in the powder adhesive is preferably from 0.05% by mass to 5.00% by mass.

The powder adhesive preferably comprises fine particles B on the surface thereof. The volume resistivity of the fine particles B at 25° C. is preferably from $5.0\times10$ $\Omega m$ to $1.0\times10^8$ $\Omega m$, and more preferably from $1.0\times10^4$ $\Omega m$ to $1.0\times10^7$ $\Omega m$.

The powder adhesive is transferred to paper by the power of charging in the transfer step. Therefore, the powder adhesive transferred on the paper is present in a charged state. When the fine particles B are present on the surface of the powder adhesive, the charge after the transfer step can be quickly relaxed. By relaxing the charge, the electrostatic cohesiveness between the powder adhesive particles is also improved, and when the pressure from the fixing unit is applied in the fixing step, the particles of the powder adhesive can easily enter the paper fibers instantly. As a result, the adhesive strength can be increased.

Examples of the fine particles B include iron oxide fine particles, titanium oxide fine particles, tin oxide fine particles, zinc oxide fine particles, aluminum oxide fine particles, strontium titanate fine particles, barium titanate fine particles, and silicone fine particles. Even if the volume resistivity of these fine particle groups alone is not within the range of $5.0\times10$ $\Omega m$ to $1.0\times10^8$ $\Omega m$, the volume resistivity may be adjusted by using a composite of two or more kinds of particles selected in appropriate combination.

The fine particle B is preferably at least one selected from the group consisting of strontium titanate fine particle, titanium oxide fine particles, and silicone fine particles.

The number average particle diameter (D1) of the primary particles of the fine particles B is preferably from 10 nm to 500 nm, and more preferably from 10 nm to 80 nm.

The amount of the fine particles B in the powder adhesive is preferably from 0.01% by mass to 5.00% by mass.

The toner and the powder adhesive may be added with a fluidity improver other than the inorganic fine particles A and the fine particles B in order to improve the flowability and chargeability.

The number average particle diameter of primary particles of the fluidity improver is preferably from 5 nm to 30 nm because high chargeability and flowability can be ensured. The fluidity improver is preferably a silica fine particle.

The amount of the fluidity improver in the powder adhesive is preferably from 0.01% by mass to 5.00% by mass.

The amount of the external additive in the toner is preferably from 0.01% by mass to 5.00% by mass.

The difference between the amount of the external additive in the toner and the amount of the external additive in the powder adhesive is preferably from 0.0% by mass to 2.5% by mass, and more preferably from 0.0% by mass to 2.0% by mass.

The average circularity of the powder adhesive is preferably 0.940 or more, and more preferably 0.970 or more. Where the average circularity of the powder adhesive is 0.940 or more, the particles of the powder adhesive tend to roll, so that they easily enter the paper fibers in the transfer step. As a result, the powder adhesive can be melted in the state of being contained in the paper fibers, so that the adhesive strength can be enhanced.

The upper limit of the average circularity of the powder adhesive is not particularly limited, but is preferably 0.995 or less, and more preferably 0.990 or less. The average circularity of the powder adhesive can be controlled by the producing conditions of the powder adhesive.

The weight average particle diameter (D4) of the toner is preferably from 4.0 μm to 20.0 μm. Within the above range, the molten state of the bonding step can be made uniform, so that the hot offset resistance is improved.

The weight average particle diameter (D4) of the powder adhesive is preferably from 3.0 μm to 17.0 μm. Within the above range, the powder adhesive is likely to enter the paper fibers in the bonding step, so that adhesive strength can be obtained.

The weight average particle diameter (D4) of the toner and the powder adhesive can be controlled by the producing conditions of the toner and the powder adhesive.

Specifically described hereinbelow is an example of an image forming apparatus and a processing device for performing bonding process of paper, which an electrophotographic developer containing a toner and a powder adhesive can be suitably used.

Overall Apparatus Configuration

First, the overall configuration of the image forming apparatus will be described with reference to FIGS. 1, 2, and 5. FIG. 1 is a schematic diagram illustrating a cross-sectional configuration of an image forming apparatus 1 including an image forming apparatus body (hereinafter, referred to as an apparatus body 10) and a post-processing unit 30 connected to the apparatus body 10. The image forming apparatus 1 is an electrophotographic image forming apparatus (electrophotographic system) configured of the apparatus body 10 provided with an electrophotographic printing mechanism, and a post-processing unit 30 as a sheet processing device.

Figure 5:
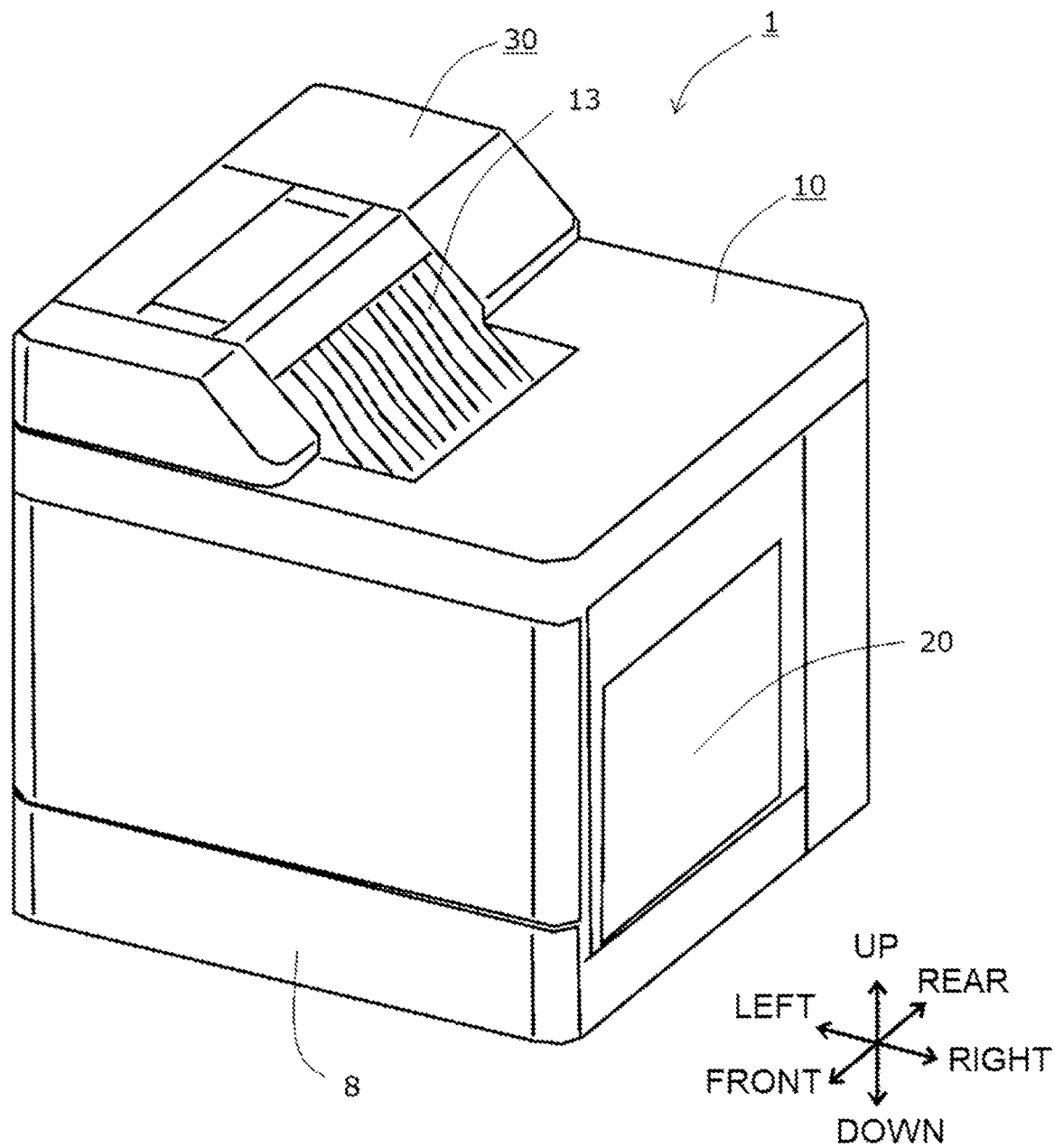
FIG. 5 is a perspective-view diagram illustrating the appearance of an image forming apparatus.

FIG. 5 is a perspective-view diagram illustrating the appearance of the image forming apparatus 1. The post-processing unit 30 is mounted on top of the apparatus body 10. The image forming apparatus 1 has a sheet cassette 8 at the bottom, an openable/closable tray 20 on the right side, and a first discharge tray 13 on the top side.

First, the internal configuration of the apparatus body 10 will be described. As shown in FIG. 1, the apparatus body 10 is provided with the sheet cassette 8 as a sheet accommodating portion for accommodating a sheet P which is a recording medium, an image forming unit 1e as an image forming means, a first fixing unit 6 as a fixing means, and a housing 19 for accommodating these units. The apparatus body 10 has a printing function of forming a toner image on the sheet P fed from the sheet cassette 8 by an image forming unit 1e and producing a printed product subjected to a fixing process by the first fixing unit 6.

The sheet cassette 8 is retractably inserted into the housing 19 at the bottom of the apparatus body 10, and accommodates a large number of sheets P. The sheets P accommodated in the sheet cassette 8 are fed from the sheet cassette 8 by a feeding member such as a feeding roller, and are transported by a transport roller 8a in a state of being separated one by one by a pair of separating rollers. It is also possible to feed the sheets set on an open tray 20 (FIG. 5) one by one.

The image forming unit 1e is a tandem type electrophotographic unit provided with four process cartridges 7n, 7y, 7m, and 7c, a scanner unit 2, and a transfer unit 3. The term process cartridge denotes a unit in which multiple components involved in the image forming process are integrally and replaceably configured into a unit.

The apparatus body 10 is provided with a cartridge support portion 9 supported by the housing 19, and the process cartridges 7n, 7y, 7m, and 7c are detachably mounted on mounting portions 9n, 9y, 9m, and 9c provided in the cartridge support portion 9. The cartridge support portion 9 may be a tray member that can be pulled out from the housing 19.

The process cartridges 7n, 7y, 7m, and 7c have a substantially common configuration except for the types of powders accommodated in four powder accommodating portions 104n, 104y, 104m, and 104c. That is, each process cartridge 7n, 7y, 7m, and 7c includes a photosensitive drum 101 as an image bearing member, a charging roller 102 as a charging device, powder accommodating portions 104n, 104y, 104m, and 104c that accommodate powders, and a developing roller 105 that performs development using the powder.

Of the four powder accommodating portions, the three powder accommodating portions 104y, 104m, and 104c on the right side in the figure accommodate yellow, magenta and cyan printing toners Ty, Tm, and Tc, respectively, as toners (first powder) for forming a visible image on the sheet P. Meanwhile, a powder adhesive Tn, which is a powder (second powder) for performing a bonding process after printing, is accommodated in the powder accommodating portion 104n on the leftmost side in the figure.

The powder accommodating portions 104y, 104m, and 104c are all examples of the first accommodating portion that accommodates the printing toner, and the powder accommodating portion 104n is an example of the second accommodating portion that accommodates the powder adhesive. Further, the process cartridges 7y, 7m, and 7c are all examples of the first process unit that forms a toner image using a printing toner, and the process cartridge 7n is an example of the second process unit that forms an image of a powder adhesive in a predetermined application pattern.

When printing a black image such as text, the image is expressed in process black in which yellow (Ty), magenta (Tm), and cyan (Tc) toners are superimposed. However, for example, a fifth process cartridge that uses a black printing toner may be added to the image forming unit 1e so that the black image can be expressed by the black printing toner.

Such options are not limiting, and the type and number of printing toners can be changed according to the application of the image forming apparatus 1.

The scanner unit 2 is arranged below the process cartridges 7n, 7y, 7m, and 7c and above the sheet cassette 8. The scanner unit 2 is an exposure means for irradiating the photosensitive drum 101 of each process cartridge 7n, 7y, 7m, and 7c with laser light G and writing an electrostatic latent image.

The transfer unit 3 includes a transfer belt 3a as an intermediate transfer body (secondary image bearing member). The transfer belt 3a is a belt member wound around a secondary transfer inner roller 3b and a tension roller 3c, and faces the photosensitive drum 101 of each process cartridge 7n, 7y, 7m, and 7c on the outer peripheral surface.

On the inner peripheral side of the transfer belt 3a there are arranged primary transfer rollers 4, at positions corresponding to respective photosensitive drums 101. Further, a secondary transfer roller 5 as a transfer means is arranged at a position opposing the secondary transfer inner roller 3b. A transfer nip 5n between the secondary transfer roller 5 and the transfer belt 3a is a transfer section (secondary transfer section) in which the toner image is transferred from the transfer belt 3a to the sheet P.

The first fixing unit 6 is arranged above the secondary transfer roller 5. The first fixing unit 6 is a heat fixing type fixing unit having a heat roller 6a as a fixing member and a pressure roller 6b as a pressing member. The heat roller 6a is heated by a heat generating element such as a halogen lamp, a ceramic heater or a heating mechanism of induction heating type. The pressure roller 6b is pressed against the heat roller 6a by an urging member such as a spring, and generates a pressurizing force that pressurizes the sheet P passing through the nip portion (fixing nip 6n) of the heat roller 6a and the pressure roller 6b.

The housing 19 is provided with a discharge port 12 (first discharge port), which is an opening for discharging the sheet P from the apparatus body 10, and a discharge unit 34 is arranged in the discharge port 12. The discharge unit 34, which is a discharge means, uses a so-called triple roller having a first discharge roller 34a, an intermediate roller 34b, and a second discharge roller 34c.

Further, a switching guide 33, which is a flap-shaped guide for switching the transport path of the sheet P, is provided between the first fixing unit 6 and the discharge unit 34. The switching guide 33 is rotatable around a shaft portion 33a so that a tip 33b reciprocates in the direction of arrow c in the figure.

The apparatus body 10 is provided with a mechanism for performing double-sided printing.

A motor (not shown) is connected to the discharge unit 34 and configured so that the rotation direction of the intermediate roller 34b can be forward and reverse. Further, a double-sided transport path 1r is provided as a transport path connected in a loop to a main transport path 1m. The sheet P where an image has been formed on the first surface while passing through the main transport path 1m is nipped and transported by the first discharge roller 34a and the intermediate roller 34b with the switching guide 33 which is rotated clockwise.

After the rear end of the sheet P in the traveling direction passes through the switching guide 33, the switching guide 33 rotates counterclockwise, the intermediate roller 34b reverses, and the sheet P is reversely transported to the double-sided transport path 1r. Then, an image is formed on the second surface of the sheet P while the sheet P passes through the main transport path 1m again with the front and back reversed.

The sheet P after double-sided printing is nipped and transported by the intermediate roller 34b and the second discharge roller 34c with the switching guide 33 rotated counterclockwise, and is discharged from the apparatus body 10.

Further, the transport path passing through the transport roller 8a, the transfer nip 5n, and the fixing nip 6n in the apparatus body 10 constitutes the main transport path 1m in which an image is formed on the sheet P. The main transport path 1m extends from the bottom to the top through one side in the horizontal direction with respect to the image forming unit 1e when viewed from the main scanning direction (the width direction of the sheet perpendicular to the transport direction of the sheet transported along the main transport path 1m) at the time of image formation.

In other words, the apparatus body 10 is a so-called vertical transport type (vertical path type) printer in which the main transport path 1m extends in a substantially vertical direction. When viewed in the vertical direction, the first discharge tray 13, the intermediate path 15, and the sheet cassette 8 overlap each other. Therefore, the moving direction of the sheet when the discharge unit 34 discharges the sheet P in the horizontal direction is opposite to the moving direction of the sheet when the sheet P is fed from the sheet cassette 8 in the horizontal direction.

Further, from the viewpoint of FIG. 1 (a view in the main scanning direction at the time of image formation), it is preferable that the horizontal occupied range of the main body portion of the post-processing unit 30 excluding the second discharge tray 35 fit into the occupied range of the apparatus body 10. By fitting the post-processing unit 30 in the space above the apparatus body 10 in this way, the image forming apparatus 1 having an adhesive printing function can be installed in about the same installation space as a normal vertical path printer.

Bonding Unit

Figure 2:
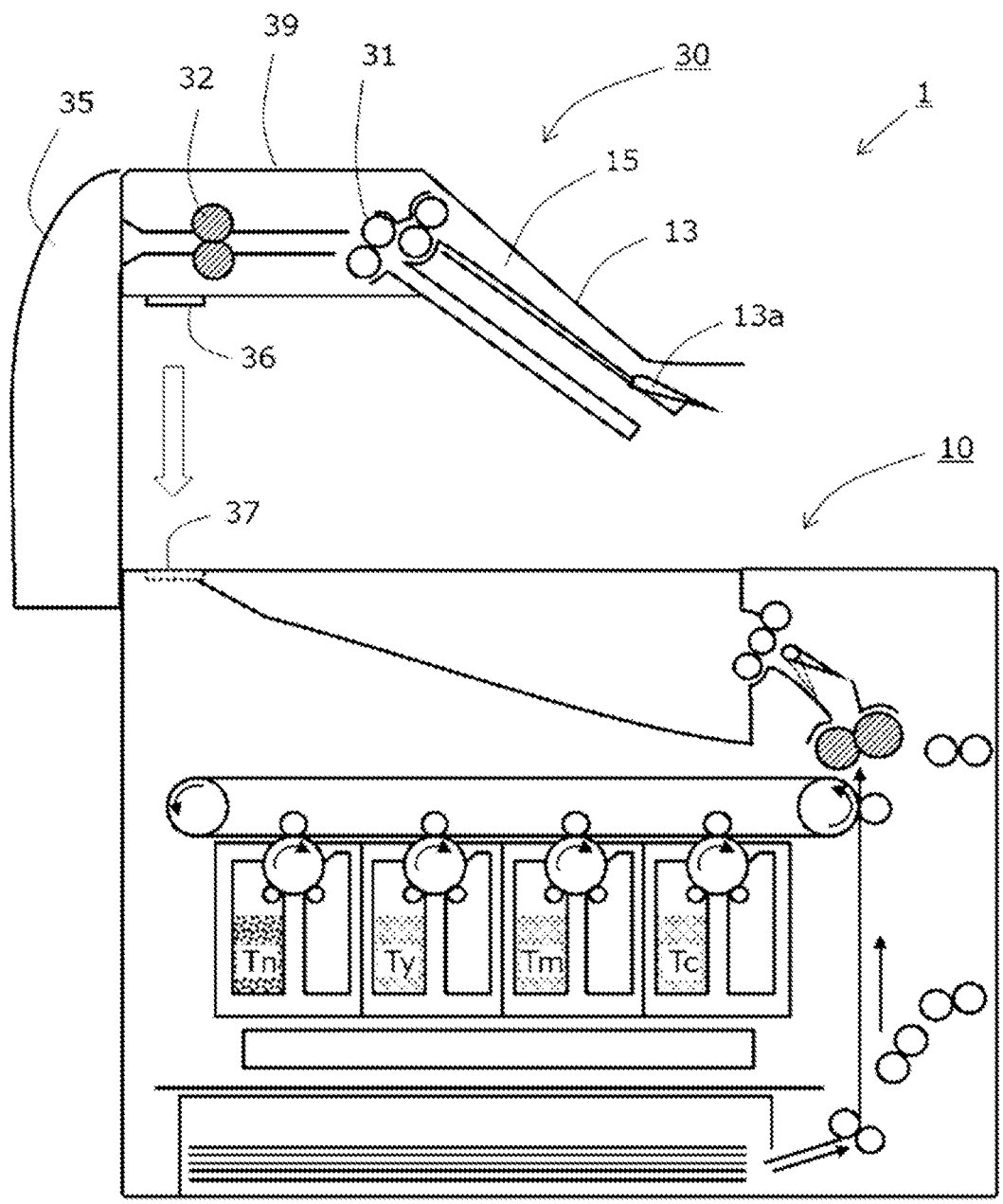
FIG. 2 is a diagram for explaining mounting of a bonding unit on the apparatus body of an image forming apparatus.

As shown in FIG. 2, the post-processing unit 30 is attached to the top of the apparatus body 10. In the post-processing unit 30, a folding device 31 as a folding means and the second fixing unit 32 as an adhesive bonding means (second fixing means) are accommodated in a housing (second housing) 39 and integrated.

Further, the post-processing unit 30 is provided with a first discharge tray 13 for rotatably holding the tray switching guide 13a, an intermediate path 15, and a second discharge tray 35. The first discharge tray 13 is provided on the upper surface of the post-processing unit 30, and is located on the top face (FIG. 1) of the entire image forming apparatus 1. The functions of each part included in the post-processing unit 30 will be described hereinbelow.

The post-processing unit 30 has a positioning portion (for example, a convex shape that engages with a concave portion of the housing 19) for positioning the housing 39 with respect to the housing 19 (first housing) of the apparatus body 10. Further, the post-processing unit 30 is provided with a drive source and a control unit separate from the apparatus body 10, and the connector 36 of the post-processing unit 30 and the connector 37 of the apparatus body 10 are joined together to electrically connect the post-processing unit to the apparatus body 10. As a result, the post-processing unit 30 is brought into an operating state based on a command from the control unit provided in the apparatus body 10 by using the electric power supplied through the apparatus body 10.

Process Cartridge

Figure 7:
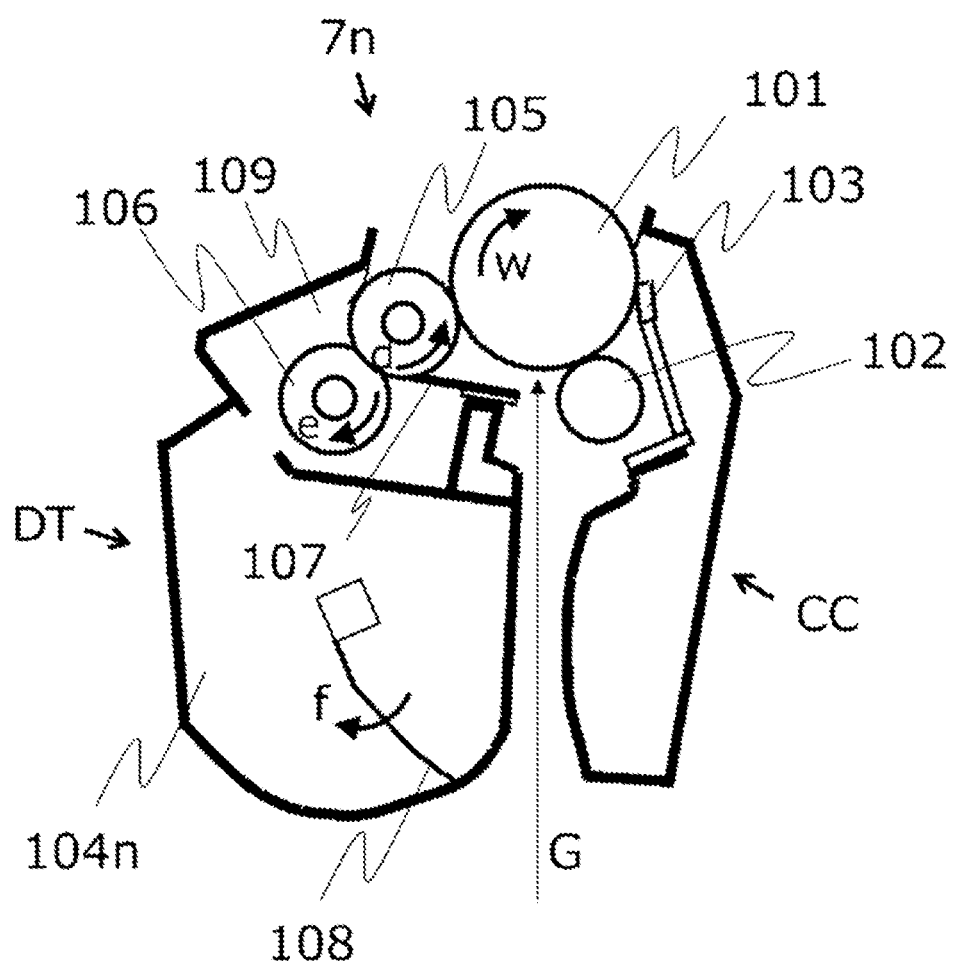
FIG. 7 is a schematic drawing of a process cartridge.

As described above, the process cartridges 7n, 7y, 7m, and 7c have substantially the same configuration except for the types of powders accommodated in the four powder accommodating portions 104n, 104y, 104m, and 104c. Here, the process cartridge 7n will be described as a representative cartridge. FIG. 7 is a schematic cross-sectional view of the process cartridge 7n. The process cartridge 7n includes a photosensitive member unit CC including a photosensitive drum 101 and the like, and a developing unit DT including a developing roller 105 and the like.

The photosensitive drum 101 is rotatably attached to the photosensitive member unit CC via a bearing (not shown). Further, the photosensitive drum 101 is rotationally driven in the clockwise direction (arrow w) in the figure according to the image forming operation by receiving the driving force of the drive motor as a driving means (driving source) (not shown). Further, in the photosensitive member unit CC, the charging roller 102 and a cleaning member 103 for charging the photosensitive drum 101 are arranged around the photosensitive drum 101. The developing unit DT is provided with the developing roller 105 as a developer carrying member that comes into contact with the photosensitive drum 101 and rotates counterclockwise (arrow d) in the figure. The developing roller 105 and the photosensitive drum 101 rotate so that their surfaces move in the same direction at the facing portion (contact portion).

Further, a developer supply roller 106 (hereinafter, simply referred to as "supply roller") as a developer supply member that rotates in the clockwise direction (arrow e) in the drawing is arranged in the developing unit DT. The supply roller 106 and the developing roller 105 rotate so that their surfaces move in the same direction at the facing portion (contact portion).

The supply roller 106 acts to supply a powder adhesive (the printing toner in the case of process cartridges 7y, 7m, and 7c) onto the developing roller 105 and to peel off the powder adhesive (the printing toner in the case of process cartridges 7y, 7m, and 7c) remaining on the developing roller 105 from the developing roller 105.

Further, a developing blade 107 as a developer regulating member that regulates the layer thickness of the powder adhesive (the printing toner in the case of process cartridges 7y, 7m, and 7c) supplied on the developing roller 105 by the supply roller 106 is arranged in the developing unit DT.

The powder adhesive (the printing toner in the case of process cartridges 7y, 7m, and 7c) is stored as powder in the powder accommodating portion 104n. Further, a rotatably supported transport member 108 is provided in the powder accommodating portion 104n. A stirring member 108 rotates in the clockwise direction (arrow f) in the figure to stir the powder stored in the powder accommodating portion 104n and transports the powder to the developing chamber 109 provided with the developing roller 105 or the supply roller 106.

Here, the photosensitive member unit CC and the developing unit DT can also be configured as separate photoconductive unit cartridge and developing unit cartridge to enable detachable attachment thereof to the image forming apparatus body. Further, the units can also be configured as a powder cartridge that has only the powder accommodating portion 104 and the transport member 108 and is detachable from the apparatus body.

Image Forming Operations

Figure 3A:
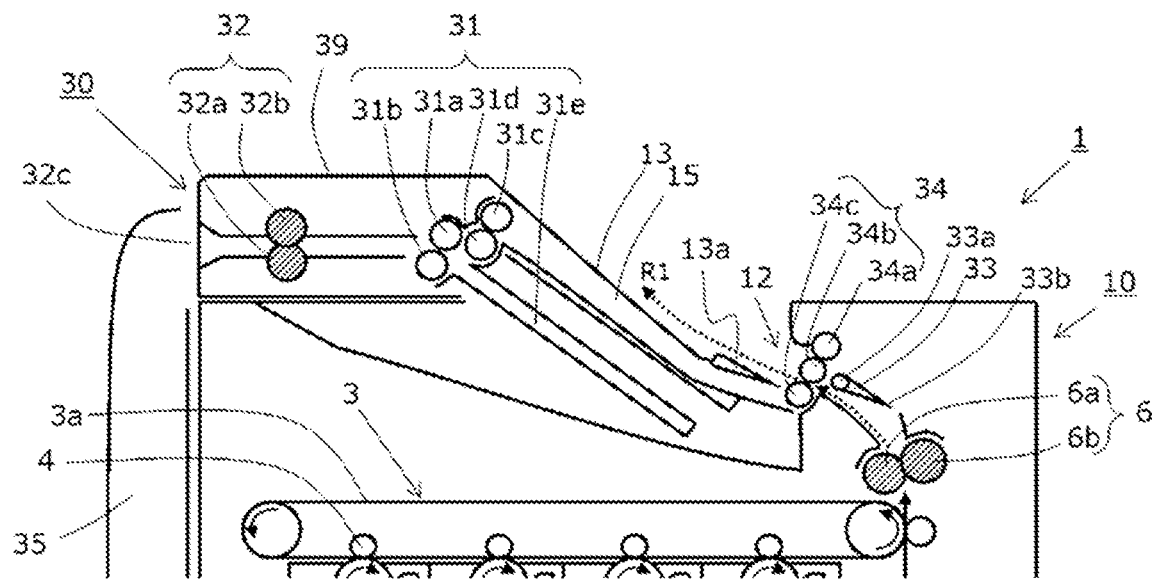
FIGS. 3A and 3B are diagrams illustrating transport paths of sheets in an image forming apparatus.
Figure 3B:
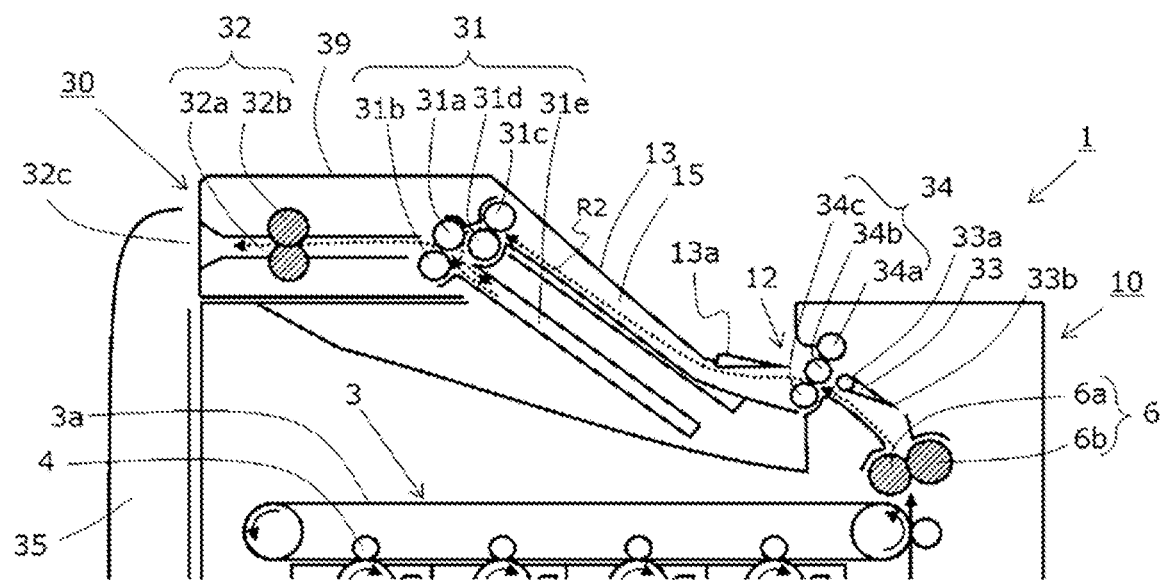
Figure 6A:
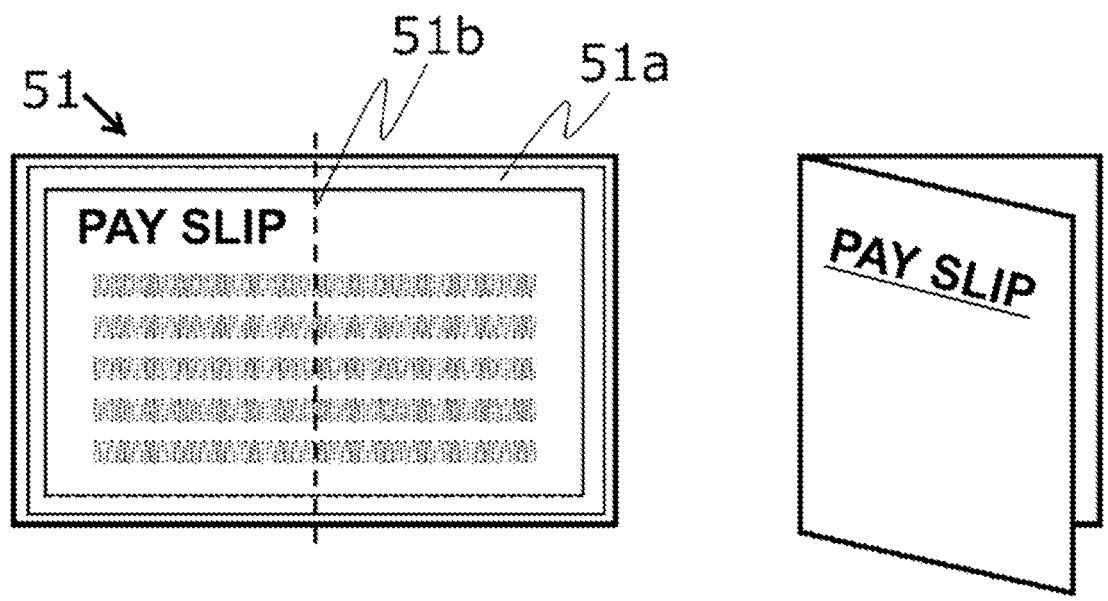
FIGS. 6A and 6B are diagrams illustrating a deliverable outputted by an image forming apparatus.
Figure 6B:
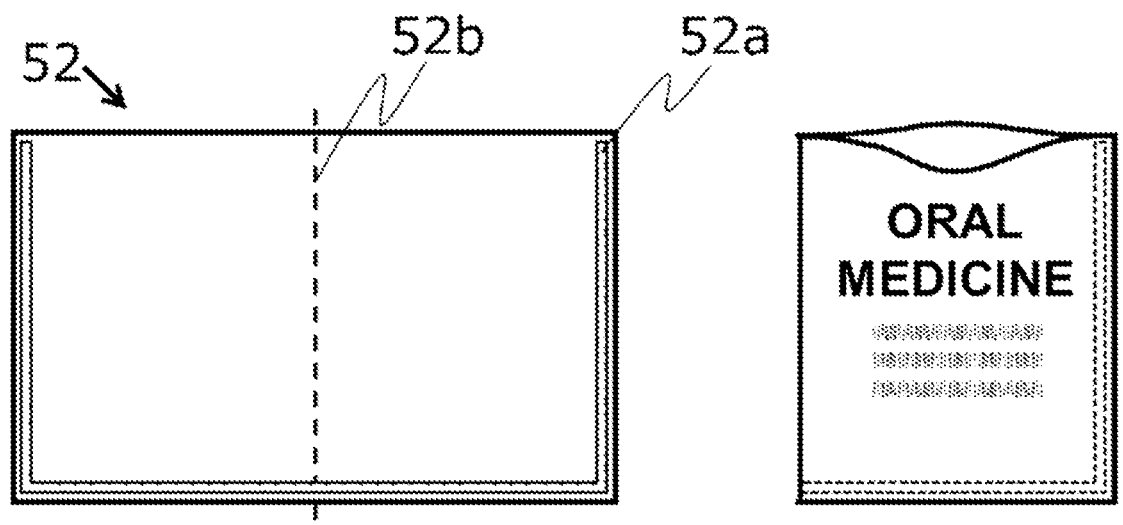

Next, the image forming operations performed by the image forming apparatus 1 will be described with reference to FIGS. 1 to 7. FIGS. 3A and 3B are diagrams illustrating a sheet transport path in the image forming apparatus 1. FIGS. 4A to 4F are diagrams for explaining the particulars of the folding process. FIGS. 6A and 6B are diagrams illustrating a deliverable outputted by the image forming apparatus 1.

When image data to be printed and a print execution command are input to the image forming apparatus 1, the control unit of the image forming apparatus 1 starts a series of operations (image forming operations) for transporting the sheet P to form an image, and if necessary, for performing post-processing with the post-processing unit 30. In the image forming operations, first, as shown in FIG. 1, the sheets P are fed one by one from the sheet cassette 8 and transported toward the transfer nip 5n via the transport roller 8a.

The process cartridges 7n, 7y, 7m, and 7c are sequentially driven in parallel with the feeding of the sheet P, and the photosensitive drum 101 is rotationally driven in the clockwise direction (arrow w) in the figure. At this time, the photosensitive drum 101 is uniformly charged on the surface by the charging roller 102.

Further, the scanner unit 2 irradiates the photosensitive drum 101 of each process cartridge 7n, 7y, 7m, and 7c with a laser beam G modulated based on the image data to form an electrostatic latent image on the surface of the photosensitive drum 101. Next, the electrostatic latent image on the photosensitive drum 101 is developed as a powder image by the powder borne on the developing rollers 105 of each process cartridge 7n, 7y, 7m, and 7c.

The powder adhesive layer formed by the powder adhesive Tn on the photosensitive drum 101 by the development is different from the toner image (normal toner image) of the printing toner for recording an image such as a figure and text on the sheet P in that the powder adhesive layer is not intended to transmit visual information. However, in the following description, the layer of the powder adhesive Tn formed in a shape corresponding to an application pattern by the electrophotographic process in order to apply the powder adhesive Tn to the sheet P in a predetermined application pattern is also handled as a "toner image".

The transfer belt 3a rotates in the counterclockwise direction (arrow v) in the figure. The toner image formed in the process cartridges 7n, 7y, 7m, and 7c is primarily transferred from the photosensitive drum 101 to the transfer belt 3a by the electric field formed between the photosensitive drum 101 and the primary transfer roller 4.

The toner image that is borne on the transfer belt 3a and has reached the transfer nip 5n is secondarily transferred by the electric field formed between the secondary transfer roller 5 and the secondary transfer inner roller 3b to the sheet P that has been transported along the main transport path 1m.

After that, the sheet P is transported to the first fixing unit 6 to undergo heat fixing treatment. That is, when the sheet P passes through the fixing nip 6n, the toner image on the sheet P is heated and pressurized, so that the printing toners Ty, Tm, and Tc and the powder adhesive Tn are melted and then fixed, so that an image fixed to the sheet P is obtained.

Regardless of whether single-sided printing or double-sided printing is performed, the sheet P discharged from the apparatus body 10 is nipped between the intermediate roller 34b and the second discharge roller 34c, as shown in FIGS. 3A and 3B, and is transported to the first route R1 or the second route R2 by the tray switching guide 13a.

In the first route R1 shown in FIG. 3A, the sheet P that has passed through the first fixing unit 6 is discharged to the first discharge tray 13 by the discharge unit 34 in the normal printing mode in which the post-processing unit 30 is not used.

In the second route R2 shown in FIG. 3B, the sheet P that has passed through the first fixing unit 6 is discharged to the second discharge tray 35 through the discharge unit 34, the folding device 31, and the second fixing unit 32 in the adhesive printing mode.

An intermediate path 15 is provided between the first fixing unit 6 and the folding device 31 in the second route R2. The intermediate path 15 is a sheet transport path that passes through the upper surface portion (top surface portion) of the image forming apparatus 1 and extends substantially parallel to the first discharge tray 13 below the first discharge tray 13. The intermediate path 15 and the first discharge tray 13 are inclined upward in the vertical direction toward the folding device 31 in the horizontal direction. Therefore, the inlet of the folding device 31 (guide roller pair (31c and 31d) described hereinbelow) is located vertically above the outlet (the nip of the intermediate roller 34b and the second discharge roller 34c) of the apparatus body 10.

The folding device 31 has four rollers: a first guide roller 31c, a second guide roller 31d, a first folding roller 31a, and a second folding roller 31b, and a draw-in portion 31e. The first guide roller 31c and the second guide roller 31d are a pair of guide rollers that nip and transport the sheet P received from the transfer path (intermediate path 15 in the present embodiment) on the upstream side of the folding device 31. The first folding roller 31a and the second folding roller 31b are a pair of folding rollers that feed out the sheet P while bending the sheet.

A spacing M (FIG. 1) from the second discharge roller 34c to the first guide roller 31c in the sheet transport direction along the second route R2 is configured to be shorter than the total length L (FIG. 4A) of the sheet P in the transport direction before the folding process. In other words, the spacing M from the second discharge roller 34c to the first guide roller 31c determines the lower limit of the length of the sheet in the transport direction that can be processed by the post-processing unit 30. With this configuration, the sheet P is delivered from the discharge unit 34 to the guide roller pair without delay.

The folding process performed by the folding device 31 will be described with reference to FIGS. 4A to 4F. When the folding process is executed, the first guide roller 31c and the first folding roller 31a rotate clockwise in the figure, and the second guide roller 31d and the second folding roller 31b rotate counterclockwise in the figure.

Figure 4A:
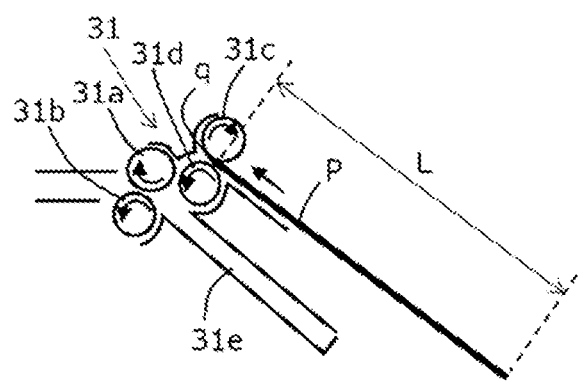
FIGS. 4A to 4F are diagrams for explaining the particulars of a folding process.

First, the front end q of the sheet P fed out from the discharge unit 34 is pulled into the guide roller pair (31c and 31d) as shown in FIG. 4A. As shown in FIG. 4B, the front end q of the sheet P is guided downward by the guide wall 31f, contacted with the first folding roller 31a, pulled between the first folding roller 31a and the second guide roller 31d facing each other, and brought into contact with the wall 31g of the draw-in portion 31e.

Figure 4D:
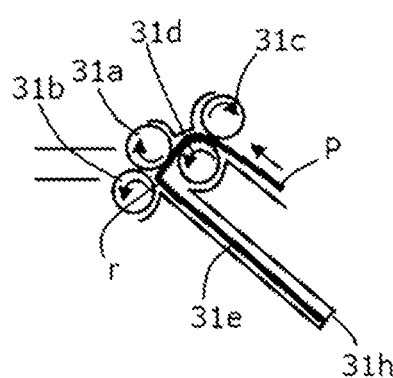
Figure 4B:
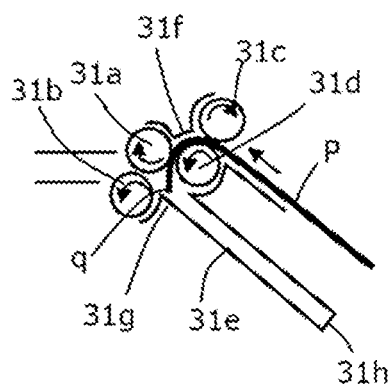
Figure 4E:
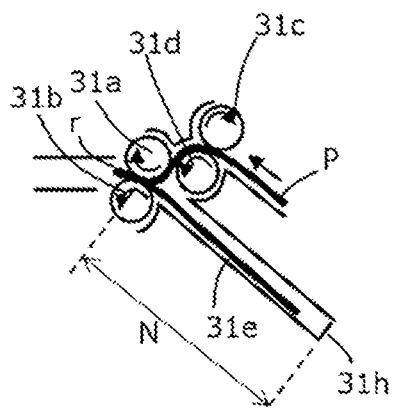
Figure 4C:
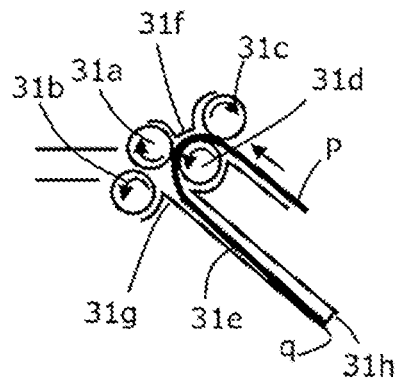
Figure 4F:
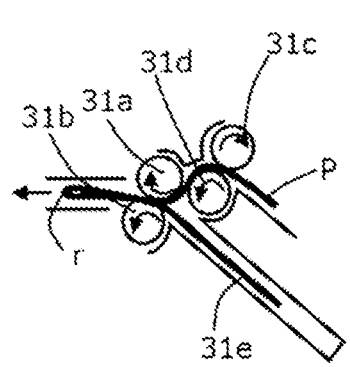

As the sheet P is pulled in by the guide roller pair (31c and 31d), the front end q advances to the back of the draw-in portion 31e while sliding in contact with the wall 31g. Eventually, the front end q abuts against an end portion 31h of the draw-in portion 31e as shown in FIG. 4C. The draw-in portion 31e forms a space extending substantially parallel to the intermediate path 15 below the intermediate path 15, and the sheet P is wound into a U-shaped bent state around the second guide roller 31d at the stage shown in FIG. 4C.

Where the sheet P is further pulled in by the guide roller pair (31c and 31d) from the state shown in FIG. 4C, deflection begins to occur in the middle portion r as shown in FIG. 4D. Eventually, as shown in FIG. 4E, the middle portion r comes into contact with the second folding roller 31b, thereby being pulled into the nip portion of the folding roller pair (31a and 31b) by the frictional force received from the second folding roller 31b. Then, as shown in FIG. 4F, the sheet P is discharged with the middle portion r at the front end by the folding roller pair (31a and 31b) in a state of being folded with the middle portion r as a crease.

Here, a depth N (FIG. 4E) of the draw-in portion 31e, that is, a distance from the nip portion of the folding roller pair (31a and 31b) to the end portion 31h of the draw-in portion 31e is set to the length which is half of the total length L of the sheet P. As a result, the folding device 31 can execute a process (middle folding) of folding the sheet P in half at half length. By changing the depth N of the draw-in portion 31e, the position of the crease can be arbitrarily changed.

The folding device 31 described above is an example of folding means, and for example, a folding mechanism that forms a crease by pressing a blade against the sheet P and pushing it into the nip portion of the roller pair may be used. Further, the contents of the folding process are not limited to folding in half, and for example, a folding mechanism that executes Z folding or tri-folding may be used.

Since the folding device 31 is configured of a rotating roller and a fixed draw-in portion 31e, the drive mechanism can be simplified as compared with a folding mechanism using a reciprocating blade. Further, since the folding device 31 may be provided with a draw-in portion 31e having a depth N of half the sheet length in addition to the four rollers, the post-processing unit 30 can be miniaturized.

The sheet P that has passed through the folding device 31 is transported to the second fixing unit 32 as shown in FIG. 3B. The second fixing unit 32 has a heat fixing configuration similar to the first fixing unit 6. That is, the second fixing unit 32 has a heat roller 32b as a heating member and a pressure roller 32a as a pressing member. The heat roller 32b is heated by a heat generating element such as a halogen lamp or a ceramic heater, or by a heating mechanism of induction heating type.

The pressure roller 32a is pressed against the heat roller 32a by an urging member such as a spring and generates a pressurizing force that pressurizes the sheet P passing through the nip portion (bonding nip) of the heat roller 32b and the pressure roller 32a.

The sheet P folded by the folding device 31 is bonded in the folded state by undergoing a bonding process (second heat fixing to the image surface coated with the powder adhesive Tn) by the second fixing unit 32. That is, when the sheet P passes through the bonding nip, the powder adhesive Tn on the sheet P is heated and pressurized in a remelted state, so as to adhere to the facing surface (in the folded state, the surface facing the image surface of the sheet P onto which the toner image of the powder adhesive Tn has been transferred). Then, when the powder adhesive Tn cools and hardens, the image surface and the facing surface of the sheet P are joined (bonded) using the powder adhesive Tn as an adhesive.

As shown in FIG. 3B, the sheet P that has undergone the bonding process by the second fixing unit 32 is discharged to the left side in the figure from the discharge port 32c (second discharge port) provided in the housing 39 of the post-processing unit 30. The sheet is then stored in the second discharge tray 35 (see FIG. 1) provided on the left side surface of the apparatus body 10. This completes the image forming operation when the sheet P is transported along the second route R2.

The joining location of the folded sheet P can be changed by the application pattern of the powder adhesive Tn on the sheet P. FIGS. 6A and 6B exemplify deliverables (output products of an image forming apparatus) having different application patterns of the powder adhesive Tn.

FIG. 6A is an example of a deliverable (half-bonded product) to be opened by a recipient. In the case of a pay slip 51 shown in FIG. 6A, the powder adhesive Tn is applied to the entire circumference 51a of the outer peripheral portion of one side of the sheet P, and the sheet P is bonded in a folded state at the central crease 51b.

FIG. 6B shows a bag (medicine bag) as an example of a deliverable (completely bonded deliverable) for applications that do not presuppose the opening. In this case, the powder adhesive Tn is applied to a U-shaped region 52a so that the three sides including the crease 52b of the folded sheet P are joined. Although no image is formed inside the bag in FIG. 6B, an image can be formed if necessary.

Further, the image forming apparatus 1 can output any of the deliverables illustrated in FIGS. 6A and 6B in a one-stop manner without preparing preprint paper. That is, it is possible to apply the powder adhesive Tn in a predetermined application pattern and output the deliverables subjected to folding process and bonding process in parallel with the operation of recording an image on one side or both sides of the sheet P by using the printing toner.

For example, when the deliverables of FIGS. 6A and 6B are output, one side of the sheet P used as the base paper is on the outside of the deliverable, and the other side is on the inside of the deliverable. Therefore, an image for the outer surface may be formed with the printing toner as an image forming operation on the first surface in double-sided printing, and an image for the inner surface may be formed with the printing toner and the powder adhesive Tn may be applied according to the predetermined application pattern as an image forming operation on the second surface.

The image recorded by the image forming apparatus 1 using the printing toner can include a format (unchanged portion) when using preprint paper and a variable portion such as personal information. Therefore, it is possible to output the deliverable bonded by the bonding process from the base paper such as blank paper which is not the preprinted paper as described above. However, the image forming apparatus 1 can also be used in applications in which the preprinted paper is used as a recording medium and the printing process and bonding process of the variable portion are performed.

Method for Producing a Bonded Product (Deliverable)

The method for producing a bonded product is a method for producing a bonded product resulting from bonding at least one sheet of paper via an adhesive portion by using the above electrophotographic developer set, wherein the bonded product has a surface A on which an adhesive portion of the powder adhesive is fixed, and a surface B on which a toner image portion of the toner is fixed, the surface B being a surface different from the surface A, wherein the method comprises the following steps, in no particular order:

forming the toner image portion on the surface B, and fixing the toner image portion on the surface B by heating; and forming the adhesive portion on the surface A, and fixing the adhesive portion on the surface A by heating, and wherein the method further comprises the following steps, after formation and fixation of the toner image portion and the adhesive portion, overlaying the paper so as to interpose the adhesive portion, and melting the adhesive portion thereby bonding the paper to obtain the bonded product.

The bonded product may be in the form obtained by folding and bonding one sheet of paper via an adhesive portion, or in the form obtained by bonding two sheets of paper via an adhesive portion. The bonded product has, for example, a bag-like or tubular form.

When paper is bonded via an adhesive portion, the surface A on which the adhesive portion is present will be present on two surfaces in the bonded product, but the adhesive portion formed by the powder adhesive may be formed on at least one of the two surfaces.

Similarly, when the paper is bonded via the adhesive portion, the surface B, which is a surface different from the surface A on which the adhesive portion is present, is present on two surfaces in the bonded product, but the toner image portion may be formed on at least one of the two surfaces. Further, the toner image portion may be formed on at least the surface B, and the toner image portion may or may not be formed on the surface A.

The order of the toner image portion formation step and the adhesive portion formation step is not limited. Either may be done first, or both may be done at the same time. The forming and fixing of the toner image portion and the forming and fixing of the adhesive portion can be performed by, for example, the above-mentioned image forming apparatus. Moreover, a known electrophotographic method can be adopted. When two sheets of paper are bonded together, the toner image portion and the adhesive portion may be formed on one of the paper sheets or both paper sheets.

When there is only one sheet of paper, the adhesive portion may be formed on one side of the paper, and the toner image portion may be formed on at least the other side.

After the toner image portion and the adhesive portion have been formed, in the case of one sheet of paper, the paper is folded to sandwich the adhesive portion, and in the case of two sheets of paper, these are stacked to sandwich the adhesive portion. Then, the paper is bonded by heating to melt the adhesive portion, and a bonded product (deliverable) is obtained. Such a bonding step can be performed by using, for example, the above-mentioned image forming apparatus or sheet processing device.

Methods for measuring physical properties are described hereinbelow.

Identification of Molecular Structure of Thermoplastic Resin and Crystalline Polyester Resin, and Methods for Measuring Amount of Crystalline Polyester Resin Contained in Toner and Powder Adhesive, and Amount of Thermoplastic Resin Contained in Powder Adhesive A pyrolysis gas chromatography mass analyzer (hereinafter, pyrolysis GC/MS) and NMR are used for identifying the molecular structure of thermoplastic resin and crystalline polyester resin and measuring the amount of crystalline polyester resin contained in the toner and powder adhesive and the amount of crystalline polyester resin contained in the powder adhesive.

In pyrolysis GC/MS, it is possible to determine the monomers that make up the total amount of resin in a sample and determine the peak area of each monomer, but for quantification, the peak intensity of a sample with a known concentration as a reference needs to be standardized. Meanwhile, in NMR, it is possible to determine and quantify the constituent monomers without using a sample having a known concentration.

Therefore, depending on the situation, the constituent monomers are determined by comparing the spectra of both NMR and pyrolysis GC/MS.

Specifically, when the amount of the resin component insoluble in deuterated chloroform, which is an extraction solvent at the time of NMR measurement, is less than 5.0% by mass, quantification is performed by NMR measurement.

Meanwhile, when the resin component insoluble in deuterated chloroform, which is an extraction solvent at the time of NMR measurement, is present in an amount of 5.0% by mass or more, NMR and pyrolysis GC/MS measurements are performed, and pyrolysis GC/MS measurement is performed for deuterated chloroform insoluble matter.

In this case, first, NMR measurement is performed for deuterated chloroform soluble matter to determine and quantify the constituent monomers (quantification result 1). Next, pyrolysis GC/MS measurement is performed on the deuterated chloroform soluble matter, and the peak area of the peak attributed to each constituent monomer is determined. Using the quantification result 1 obtained by NMR measurement, the relationship between the amount of each constituent monomer and the peak area of pyrolysis GC/MS is determined.

Next, pyrolysis GC/MS measurement of deuterated chloroform insoluble matter is performed, and the peak area of the peak attributed to each constituent monomer is determined. Based on the relationship between the amount of each constituent monomer obtained by measuring the deuterated chloroform soluble matter and the peak area of pyrolysis GC/MS, the constituent monomer in deuterated chloroform insoluble matter is quantified (quantification result 2).

Then, the quantification result 1 and the quantification result 2 are combined to obtain the final quantification result of each constituent monomer. Specifically, the following operations are performed.

(1) A total of 50 mg of toner or powder adhesive is precisely weighed in an 8 mL glass sample bottle, 1 mL of deuterated chloroform is added, a lid is closed, and the components is dispersed and dissolved by an ultrasonic disperser for 1 h. Then, filtration is performed with a membrane filter having a pore diameter of 0.4 μm and the filtrate is collected. At this time, the deuterated chloroform insoluble matter remains on the membrane filter.

(2) $^1$H-NMR measurement is performed on the filtrate, and the spectrum is attributed to each constituent monomer in the resin to obtain a quantitative value.

(3) Where the deuterated chloroform insoluble matter needs to be analyzed, it is analyzed by pyrolysis GC/MS. If necessary, derivatization treatment such as methylation is performed.

NMR Measurement Conditions

Bruker AVANCE 500 manufactured by Bruker Biospin Co., Ltd.

Measurement nucleus: $^1$H.
Measurement frequency: 500.1 MHz.
Accumulation number: 16 times.
Measurement temperature: room temperature.

Measurement Conditions for Pyrolysis GC/MS
Pyrolysis device: TPS-700 manufactured by Nippon Analytical Industry Co., Ltd.

Pyrolysis temperature: appropriate value from 400° C. to 600° C.

GC/MS device: ISQ manufactured by Thermo Fisher Scientific Co., Ltd.

Column: "HP5-MS" (Agilent/190915-433), length 30 m, inner diameter 0.25 mm, membrane thickness 0.25 μm.

GC/MS conditions.
Inlet conditions:
InletTemp: 250° C.
SpiritFlow: 50 mL/min.
GC temperature rise condition: 40° C. (5 min)→10° C./min (300° C.)→300° C. (20 min).

Method for Measuring Glass Transition Temperature (Tg) of Thermoplastic Resin

The glass transition temperature (Tg) of the thermoplastic resin is measured using a differential scanning calorimeter "Q1000" (manufactured by TA Instruments). The melting points of indium and zinc are used for temperature correction of the device detector, and the heat of fusion of indium is used for the correction of calorific value.

Specifically, 1 mg of the sample is precisely weighed, placed in an aluminum pan, and an empty aluminum pan is used as a reference. Using a modulation measurement mode, the measurement is performed in the range of 0° C. to 100° C. at a temperature rise rate of 1° C./min and a temperature modulation condition of ±0.6° C./60 sec. Since the specific heat change is obtained in the temperature rise process, the intersection of the line between the midpoint of a baseline from before to after the specific heat change and the differential thermal curve is defined as the glass transition temperature (Tg).

Method for Measuring Weight Average Particle Diameter (D4) of Powder Adhesive and Toner The weight average particle diameter (D4) is calculated as follows.

A precision particle size distribution measurement device operating on the aperture impedance method and equipped with a 100 μm aperture tube "Coulter Counter Multisizer 3" (registered trademark, manufactured by Beckman Coulter Co., Ltd.) aperture impedance method is used as a measuring device. The attached dedicated software "Beckman Coulter Multisizer 3 Version 3.51" (manufactured by Beckman Coulter Co., Ltd.) is used for setting the measurement conditions and analyzing the measurement data. The measurement is performed with 25,000 effective measurement channels.

A solution obtained by dissolving special grade sodium chloride in ion-exchanged water to a concentration of 1.0%, for example, "ISOTON II" (manufactured by Beckman Coulter Co., Ltd.) can be used as an electrolytic aqueous solution to be used for the measurement.

The dedicated software is configured as follows prior to the measurement and analysis.

On the "Change Standard Measurement Method (SOMME)" screen of the dedicated software, the total count number in the control mode is set to 50,000 particles, the measurement number is set to 1, and the Kd value is set to a value obtained using "Standard Particles 10.0 μm" (manufactured by Beckman Coulter Co., Ltd.). The threshold and noise level are automatically set by pressing the "Threshold/Noise Level Measurement Button". Further, the current is set to 1,600 μA, the gain is set to 2, the electrolyte to ISOTON II, and a check is entered for "Flash the Aperture Tube After Measurement".

On the "Conversion Setting from Pulse to Particle Diameter" screen of the dedicated software, the bin interval is set to a logarithmic particle diameter, the particle diameter bins are set to 256 particle diameter bins, and the particle diameter range is set from 2 μm to 60 μm.

The specific measurement method is as follows.

(1) 200.0 mL of the electrolytic aqueous solution is placed in a 250 mL glass round-bottomed beaker dedicated to Multisizer 3, the beaker is set on a sample stand, and stirred counter-clockwise at a rate of 24 rotations per second of the stirrer rod. Then, contamination and air bubbles in the aperture tube are removed by the "Flash the Aperture Tube" function of the dedicated software.

(2) 30.0 mL of the electrolytic aqueous solution is placed in a 100 mL glass flat-bottomed beaker. 0.3 mL of a diluted solution obtained by three-fold by mass dilution of "CONTAMINON N" (a 10% aqueous solution of a pH 7 neutral detergent for cleaning precision measurement instruments, comprising a nonionic surfactant, an anionic surfactant, and an organic builder; manufactured by Wako Pure Chemical Industries, Ltd.) with ion-exchanged water is added thereto as a dispersant.

(3) An ultrasonic dispersing unit "Ultrasonic Dispersion System Tetora 150" (produced by Nikkaki Bios Co., Ltd.), which has an electrical output of 120 W and is equipped with two built-in oscillators with an oscillation frequency of 50 kHz disposed so that their phases are displaced by 180 degrees, is prepared. 3.3 L of ion-exchanged water is poured into the water tank of the ultrasonic dispersing unit, and 2.0 mL of the CONTAMINON N is added into the water tank.

(4) The beaker of (2) above is set in a beaker fixing hole of the ultrasonic dispersing unit, and the ultrasonic dispersing unit is operated. Then, the height position of the beaker is adjusted to maximize the resonance state of the surface of the aqueous electrolytic solution in the beaker.

(5) 10 mg of the measurement sample is added bit by bit and dispersed in the aqueous electrolytic solution in the beaker of (4) above while irradiating the aqueous electrolytic solution with ultrasonic waves. Then, the ultrasonic dispersion treatment is continued for another 60 seconds. During the ultrasonic dispersion, the temperature of water in the water tank is adjusted, as appropriate, to be from 10° C. to 40° C.

(6) The aqueous electrolytic solution of (5) above, in which the toner particles have been dispersed, is added dropwise with a pipette into the round-bottom beaker of (1) above placed in a sample stand, and the measurement concentration is adjusted to 5%. Measurements are performed until the number of measured particles reaches 50,000.

(7) The measurement data is analyzed with the dedicated software included with the device, and the weight-average particle diameter (D4) is calculated. The weight-average particle diameter (D4) is the "Average Diameter" on the "Analysis/Volumetric Statistical Value (Arithmetic Average)" screen when the dedicated software is set to graph/vol %.

Method for Measuring Storage Elastic Modulus and tan δ of Toner and Powder Adhesive The measurement is performed using a dynamic viscoelasticity measuring device (rheometer) ARES (manufactured by Rheometrics Scientific). The toner or the powder adhesive is used as a sample.

Measuring jig: a serrated type parallel plate with a diameter of 7.9 mm is used.

Measurement sample: a columnar sample having a diameter of about 8 mm and a height of about 2 mm is molded from 1.0 g of the sample by using a pressure molding machine (15 kN is maintained at room temperature for 1 min). As the pressure molding machine, a 100 kN press NT-100H manufactured by NPa System Co., Ltd. is used.

The temperature of the serrated parallel plate is adjusted to 120° C., the columnar sample is heated and melted, the serrated teeth are made to bite into the sample, a vertical load is applied so that the axial force does not exceed 30 (gf) (0.294N), and the sample is fixedly attached to the serrated parallel plate. At this time, a steel belt may be used so that the diameter of the sample is the same as the diameter of the parallel plate. The serrated parallel plate and the columnar sample are slowly cooled to a measurement start temperature of 30.00° C. over 1 h.

Measurement frequency: 6.28 radian/sec.

Measurement distortion setting: the initial value is set to 0.1% and measurement is performed in the automatic measurement mode.

Sample elongation correction: adjustment is performed in an automatic measurement mode.

Measurement temperature: the temperature is raised from 30° C. to 180° C. at a rate of 2° C. per minute.

Measurement interval: viscoelastic data are measured every 30 sec, that is, every 1° C.

From the curve of the storage elastic modulus obtained by this measurement, Gb'(100), Tb, and tan δ of the powder adhesive, and Gt'(100) and Tt of the toner are obtained.

Method for Measuring Melting Point of Crystalline Polyester Resin

The melting point of the crystalline polyester resin used for the toner and the powder adhesive is measured using DSC Q1000 (manufactured by TA Instruments) under the following conditions.

Temperature rise rate: 10° C./min.
Measurement start temperature: 20° C.
Measurement end temperature: 180° C.

The melting points of indium and zinc are used for temperature correction of the device detector portion, and the heat of fusion of indium is used for the correction of calorific value.

Specifically, 5 mg of the sample is precisely weighed and placed in an aluminum pan, and differential scanning calorimetry is performed. An empty silver pan is used as a reference.

The peak temperature of the maximum endothermic peak in the first temperature rise process is defined as the melting point.

The maximum endothermic peak is the peak with the maximum endothermic quantity when there are multiple peaks.

Isolation of Crystalline Polyester Resin from Toner or Powder Adhesive

It is also possible to measure each physical property by using the crystalline polyester resin isolated from the toner or the powder adhesive by the following method.

The toner or powder adhesive is dispersed in ethanol, which is a poor solvent for the toner or powder adhesive, and the temperature is raised to exceed the melting point of the crystalline polyester resin. At this time, if necessary, pressurization may be performed. At this point, the crystalline polyester resin that exceeds the melting point is melted.

After that, the crystalline polyester resin can be collected from the toner or the powder adhesive by solid-liquid separation. When the separated crystalline material is a mixture, the crystalline polyester resin can be isolated by classifying the mixture by molecular weight. The crystalline polyester resin can also be identified from the molecular structure of the crystalline material by the method described above.

Method for Measuring Number Average Molecular Weight Mn and Weight Average Molecular Weight Mw of Thermoplastic Resin and Crystalline Polyester Resin The molecular weight Mn and Mw of the thermoplastic resin and the crystalline polyester resin used for the toner and the powder adhesive is measured by gel permeation chromatography (GPC) in the following manner.

First, the sample is dissolved in tetrahydrofuran (THF) at room temperature for 24 h. Then, the obtained solution is filtered through a solvent-resistant membrane filter "Myshori Disc" (manufactured by Tosoh Corporation) having a pore diameter of 0.2 μm to obtain a sample solution. The sample solution is adjusted so that the concentration of the fraction soluble in THF is about 0.8% by mass. This sample solution is used for measurement under the following conditions.

Device: HLC8120 GPC (Detector: RI) (manufactured by Tosoh Corporation)
Column: seven sets of Shodex KF-801, 802, 803, 804, 805, 806, and 807 (manufactured by Showa Denko KK).
Eluent: tetrahydrofuran (THF).
Flow velocity: 1.0 ml/min.
Oven temperature: 40.0° C.
Sample injection volume: 0.10 ml.

For calculating the molecular weight of the sample, a molecular weight calibration curve created using standard polystyrene resins (for example, trade name "TSK standard polystyrene F-850, F-450, F-288, F-128, F-80, F-40, F-20, F-10, F-4, F-2, F-1, A-5000, A-2500, A-1000, and A-500", manufactured by Tosoh Corporation) is used.

Method for Measuring Average Circularity of Powder Adhesive

The average circularity of the powder adhesive is measured by a flow type particle image analyzer "FPIA-3000" (manufactured by Sysmex Corporation) under the measurement and analysis conditions at the time of calibration operation.

The specific measurement method is as follows.

First, about 20 mL of ion-exchanged water from which solid impurities and the like have been removed in advance is put in a glass container. 0.2 ml of a diluted solution obtained by three-fold by mass dilution of "CONTAMINON N" (a 10% aqueous solution of a pH 7 neutral detergent for cleaning precision measuring instruments and consisting of a nonionic surfactant, an anionic surfactant, and an organic builder; manufactured by Wako Pure Chemical Industries, Ltd.) with ion-exchanged water is added thereto as a dispersant.

Further, about 0.02 g of the measurement sample is added, and the dispersion treatment is performed for 2 minutes using an ultrasonic disperser to prepare a dispersion liquid for measurement. At that time, the dispersion liquid is cooled, as appropriate, so that the temperature thereof is from 10° C. to 40° C.

As the ultrasonic disperser, a desktop ultrasonic washer disperser (for example, "VS-150" (manufactured by Velvo-Clear Co., Ltd.)) having an oscillation frequency of 50 kHz and an electrical output of 150 W is used, a predetermined amount of ion-exchanged water is added into a water tank, and about 2 mL of CONTAMINON N is added into the water tank.

For the measurement, a flow-type particle image analyzer equipped with "LUCPLFLN" (magnification of 20 times, numerical aperture of 0.40) as the objective lens is used, and a particle sheath "PSE-900A" (manufactured by Sysmex Corporation) is used as a sheath liquid. The dispersion liquid prepared according to the above procedure is introduced into the flow-type particle image analyzer, and 2,000 particles are measured in a total count mode in a HPF measurement mode.

Then, a binarization threshold value at the time of particle analysis is set to 85%, the diameter of the analyzed particles is limited to the equivalent circle diameter of from 1.977 μm or more to less than 39.54 μm, and the average circularity of the sample is obtained.

In the measurement, automatic focus adjustment is performed using standard latex particles (for example, "RESEARCH AND TEST PARTICLES Latex Microsphere Suspensions 5100A" (manufactured by Duke Scientific) diluted with ion-exchanged water) before the start of measurement. It is preferable that focus adjustment be thereafter performed every 2 hours from the start of measurement.

In the embodiment of the present application, a flow-type particle image analyzer that has been calibrated by Sysmex Corporation and has been issued a calibration certificate by Sysmex Corporation is used. The measurement is performed under the measurement and analysis conditions at the time of receiving the calibration certificate, except that the diameter of the analysis particle is limited to the equivalent circle diameter of from 1.977 μm or more to less than 39.54 μm.

Method for Measuring Number Average Particle Size of Primary Particles of Inorganic Fine Particles A and Fine Particles B The number average particle diameter of primary particles of the inorganic fine particles A and the fine particles B is measured using a transmission electron microscope "JEM-2800" (JEOL Ltd.).

By observing the powder adhesive on which the inorganic fine particles A and the fine particles B are externally attached, the major axis of 100 primary particles of the inorganic fine particles A and the fine particles B is randomly measured in a field magnified up to 200,000 times to obtain the number average particle diameter. The observation magnification may be adjusted, as appropriate, according to the sizes of the inorganic fine particles A and the fine particles B.

A means for distinguishing the inorganic fine particles A and the fine particles B from the other inorganic fine particles on the surface of the powder adhesive is described hereinbelow.

The powder adhesive is ultrasonically dispersed in methanol to remove the inorganic fine particles A and B and other inorganic fine particles, and the system is allowed to stand for 24 h. The precipitated powder adhesive particles, the inorganic fine particles A and B dispersed in the supernatant liquid, and other inorganic fine particles are separated. Further, it is possible to separate the supernatant liquid by a centrifugal separation method to isolate the inorganic fine particles A and fine particles B, and other inorganic fine particles.

TEM-EDX and shape analysis are performed on the isolated inorganic fine particles A and fine particles B, and other inorganic fine particles, and after distinguishing fine particles of each type based on the obtained analysis result, the particle diameter is measured under the transmission electron microscope observation.

Method for Measuring Volume Resistivity of Fine Particles B

The volume resistivity of the fine particles B is measured in an environment of 25° C. in the following manner.

A 6517 type electrometer/high-resistance system manufactured by Keithley Instruments Inc. is used as a device. Electrodes having a diameter of 25 mm are connected, a sample is placed between the electrodes so that the thickness is 0.5 mm, and the distance between the electrodes is measured under an applied load of about 2.0 N (about 204 g).

The resistance value when a voltage of 1000 V is applied to the fine particles B for 1 minute is measured, and the volume resistivity is calculated using the following formula.

Volume resistivity($\Omega$cm)=$R \times L$

R: resistance value ($\Omega$).
L: distance between electrodes (cm).

Isolation of Fine Particles B from Powder Adhesive

It is also possible to measure each physical property using the fine particles B isolated from the powder adhesive by the above method.

Method for Measuring Amount of Polyvalent Metal Elements in Powder Adhesive

The amount of polyvalent metal elements in the powder adhesive is quantified by an inductively coupled plasma emission spectrophotometer (ICP-AES (manufactured by Seiko Instruments)).

As a pretreatment, acid decomposition is performed using 8.00 ml of 60% nitric acid (manufactured by Kanto Chemical Co., Inc.; for atomic absorption spectrometry) with respect to 100.0 mg of powder adhesive.

During acid decomposition, a microwave high-power sample pretreatment device ETHOS 1600 (manufactured by Milestone General Co., Ltd.) is used to treat the sample in a sealed container at an internal temperature of 220° C. for 1 hour to prepare a polyvalent metal element-containing solution sample.

After that, a measurement sample is prepared by adding ultrapure water to obtain a total weight of 50.00 g. A calibration curve is created for each polyvalent metal element and the amount of metal contained in each sample is quantified. Ultrapure water is added to 8.00 ml of nitric acid to make a total of 50.00 g, which is measured as a blank, and the amount of metal in the blank is subtracted.

Method for Measuring Amount of Colorant in Powder Adhesive

The amount of the colorant in the powder adhesive is quantified using an ultraviolet-visible absorption spectrum method. A 1 mm thick square spacer is laid on a slide glass, 50 mg of powder adhesive is placed thereon, and the adhesive is heated and melted on a hot plate at from 120° C. to 180° C. After that, a slide glass is placed on the spacer to sandwich the adhesive, followed by cooling. The absence of bubbles and the like is confirmed and measurement is performed with an ultraviolet-visible spectrophotometer.

Where a crystalline material such as wax is included and it is difficult to quantify due to the crystalline portion, separate samples for the THF soluble and insoluble matters of the powder adhesive are prepared and measured.

The THF insoluble matter of the powder adhesive is obtained by the following procedure. 500 mg of the powder adhesive is put in a cylindrical filter paper (trade name: No. 86R, size 28×100 mm, manufactured by Advantech Toyo Co., Ltd.) and set it in a Soxhlet extractor. Extraction is carried out using 200 mL of THF as a solvent for 18 h, and at that time, extraction is performed at a reflux rate such that the extraction cycle of the solvent is once every about 5 minutes. After completion of the extraction, the cylindrical filter paper is taken out and air-dried, and then vacuum-dried at 40° C. for 8 hours to obtain the extraction residue as a THF insoluble matter.

The THF soluble matter of the powder adhesive is measured by dissolving 50 mg of a sample in 30 ml of THF and putting the solution in a quartz cell of 10 mm×10 mm×50 mm. Where sufficient absorbance cannot be obtained, the amount of THF is adjusted as appropriate. Regarding the quantification, the structure of the colorant contained in the powder adhesive is identified in advance, the same compound is prepared separately, a calibration curve is created, and the calibration is performed.

A method for preparing a sample for creating the calibration curve is shown below.

The following materials are weighed in a glass bottle and dispersed for 18 hours using a paint shaker.

Colorant: 5.00 parts by mass.
Zirconia beads having a diameter of 2 mm: 70 parts by mass.
Toluene: 45.00 parts by mass.

The obtained dispersion is diluted with toluene, diluted 100,000 times, diluted 10,000 times, diluted 1,000 times, and diluted 100 times to prepare samples, and a calibration curve is obtained.

The absorption spectra of the obtained samples are measured using an ultraviolet-visible spectrophotometer (UV-2600, manufactured by Shimadzu Corporation), quantification is performed at the characteristic absorption wavelength of the colorant, and the amount of the colorant in the powder adhesive is measured.

EXAMPLE

Hereinafter, the present invention will be specifically described with reference to examples, but the present invention is not limited to these examples. In the examples, the parts are based on mass unless otherwise specified.

Production Example of Crystalline Polyester Resin 1

| 1,10-Decanediol | 183 parts |
| Sebacic acid | 230 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the mixture was stirred at 170° C. for 6 h. Then, the temperature was gradually raised to 210° C. to 230° C. under reduced pressure while continuing stirring, and the temperature was maintained until the desired molecular weight Mn was reached. A crystalline polyester resin 1 was synthesized by air-cooling and stopping the reaction when a viscous state was reached.

The number average molecular weight (Mn) of the crystalline polyester resin 1 was 7,200, and the melting point was 72° C.

Production Example of Crystalline Polyester Resins 2 to 9

Crystalline polyester resins 2 to 9 were obtained in the same manner as in the Production Example of Crystalline Polyester Resin 1 except that the formulation was changed as shown in Table 1.

The composition and physical properties of the crystalline polyester resins 2 to 9 are shown in Table 1.

TABLE 1

| Crystalline polyester resin No. | Alcohol monomer | | | | | Acid monomer | | | | | Molecular weight Mn | Melting point (° C.) |
|---|---|---|---|---|---|---|---|---|---|---|---|---|
| | Type | Number of carbon atoms | Number of parts | Type | Number of carbon atoms | Number of parts | Type | Number of carbon atoms | Number of parts | Type | Number of parts | | |
| 1 | 1,10-Decane diol | 10 | 183 | — | — | — | Sebacic acid | 10 | 230 | — | — | 7200 | 72 |
| 2 | 1,9-Nonane diol | 9 | 168 | — | — | — | Sebacic acid | 10 | 230 | — | — | 6800 | 60 |
| 3 | 1,10-Decane diol | 10 | 91 | 1,4-Butane diol | 4 | 48 | Sebacic acid | 10 | 230 | — | — | 7900 | 87 |
| 4 | 1,6-Hexane diol | 6 | 124 | — | — | — | 1,10-Decanedi-carboxylic acid | 12 | 265 | — | — | 7000 | 67 |
| 5 | 1,10-Decane diol | 10 | 183 | — | — | — | Sebacic acid | 10 | 218 | Trimellitic anhydride | 10 | 6800 | 72 |
| 6 | 1,10-Decane diol | 10 | 180 | — | — | — | Sebacic acid | 10 | 230 | — | — | 4000 | 67 |
| 7 | 1,10-Decane diol | 10 | 110 | 1,4-Butane diol | 4 | 37 | Sebacic acid | 10 | 230 | — | — | 6800 | 98 |
| 8 | 1,10-Decane diol | 10 | 183 | — | — | — | Sebacic acid | 10 | 210 | Trimellitic anhydride | 25 | 5000 | 98 |
| 9 | 1,10-Decane diol | 10 | 183 | — | — | — | Sebacic acid | 10 | 197 | Trimellitic anhydride | 38 | 6400 | 105 |

Production Example of Amorphous Polyester Resin 1

| | |
|---|---|
| Terephthalic acid | 30.0 parts |
| Isophthalic acid | 10.0 parts |
| Sebacic acid | 15.0 parts |
| Dodecenyl succinic acid | 20.0 parts |
| Trimellitic acid | 6.9 parts |
| Bisphenol A ethylene oxide (2 mol) adduct | 70.0 parts |
| Bisphenol A propylene oxide (2 mol) adduct | 90.0 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the polycondensation reaction was carried out at 150° C. to 230° C. for about 13 h, and then the pressure was gradually reduced at 210° C. to 250° C. to obtain an amorphous polyester resin 1.

The number average molecular weight (Mn) of the amorphous polyester resin 1 was 19,400, the weight average molecular weight (Mw) was 85,000, and the glass transition temperature (Tg) was 58° C.

Production Example of Amorphous Polyester Resin 2

| | |
|---|---|
| Terephthalic acid | 28.0 parts |
| Isophthalic acid | 10.0 parts |
| Sebacic acid | 17.0 parts |
| Dodecenylsuccinic acid | 20.0 parts |
| Trimellitic acid | 6.9 parts |
| Bisphenol A ethylene oxide (2 mol) adduct | 68.0 parts |
| Bisphenol A propylene oxide (2 mol) adduct | 92.0 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the polycondensation reaction was carried out at 150° C. to 230° C. for about 13 h, and then the pressure was gradually reduced at 210° C. to 250° C. to obtain an amorphous polyester resin 2.

The number average molecular weight (Mn) of the amorphous polyester resin 2 was 14,200, the weight average molecular weight (Mw) was 69,000, and the glass transition temperature (Tg) was 56° C.

Production Example of Amorphous Polyester Resin 3

| | |
|---|---|
| Terephthalic acid | 48.0 parts |
| Dodecenylsuccinic acid | 17.0 parts |
| Trimellitic acid | 10.2 parts |
| Bisphenol A ethylene oxide (2 mol) adduct | 80.0 parts |
| Bisphenol A propylene oxide (2 mol) adduct | 74.0 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the polycondensation reaction was carried out at 150° C. to 230° C. for about 13 h, and then the pressure was gradually reduced at 210° C. to 250° C. to obtain an amorphous polyester resin 3.

The number average molecular weight (Mn) of the amorphous polyester resin 3 was 21,200, the weight average molecular weight (Mw) was 98,000, and the glass transition temperature (Tg) was 58° C.

Production Example of Amorphous Polyester Resin 4

| | |
|---|---|
| Terephthalic acid | 40.0 parts |
| Dodecenylsuccinic acid | 10.5 parts |
| Trimellitic acid | 16.5 parts |
| Bisphenol A ethylene oxide (2 mol) adduct | 70.0 parts |
| Bisphenol A propylene oxide (2 mol) adduct | 70.0 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the polycondensation reaction was carried out at 150° C. to 230° C. for about 13 h, and then the pressure was gradually reduced at 210° C. to 250° C. to obtain an amorphous polyester resin 4.

The number average molecular weight (Mn) of the amorphous polyester resin 4 was 33,300, the weight average molecular weight (Mw) was 134,000, and the glass transition temperature (Tg) was 61° C.

Production Example of Amorphous Polyester Resin 5

| | |
|---|---|
| Terephthalic acid | 40.0 parts |
| Dodecenylsuccinic acid | 11.5 parts |
| Trimellitic acid | 14.4 parts |
| Bisphenol A ethylene oxide (2 mol) adduct | 70.0 parts |
| Bisphenol A propylene oxide (2 mol) adduct | 70.0 parts |
| Dibutyltin oxide | 0.1 part |

The above materials were placed in a heat-dried two-necked flask, nitrogen gas was introduced into the container, and the temperature was raised while maintaining an inert atmosphere and stirring. Then, the polycondensation reaction was carried out at 150° C. to 230° C. for about 13 h, and then the pressure was gradually reduced at 210° C. to 250° C. to obtain an amorphous polyester resin 5.

The number average molecular weight (Mn) of the amorphous polyester resin 5 was 23,800, the weight average molecular weight (Mw) was 107,000, and the glass transition temperature (Tg) was 59.8° C.

Production Example of Crystalline Polyester Dispersion Liquid 1

100.0 parts of ethyl acetate, 30.0 parts of crystalline polyester resin 1, 0.3 parts of 0.1 mol/L sodium hydroxide, and 0.2 parts of an anionic surfactant (NEOGEN RK, manufactured by Dai-ichi Kogyo Seiyaku Co., Ltd.) were charged in a beaker equipped with a stirrer, heated to 60.0° C., and continuously stirred until complete dissolution.

While further stirring, 90.0 parts of ion-exchanged water was gradually added, phase-inverted emulsification was performed, and the solvent was removed to obtain a crystalline polyester dispersion liquid 1 (solid fraction concentration: 20% by mass).

The volume average particle diameter of the resin particles in the crystalline polyester dispersion liquid 1 was 0.17 µm.

Production Examples of Crystalline Polyester Dispersion Liquids 2 to 9

Crystalline polyester dispersion liquids 2 to 9 were obtained in the same manner as in the Production Example of Crystalline Polyester Dispersion Liquid 1 except that the crystalline polyester resins shown in Table 2 were used. Table 2 shows the formulation and physical characteristics.

Production Examples of Amorphous Resin Dispersion Liquids 1 to 5

Amorphous resin dispersion liquids 1 to 5 were obtained in the same manner as in the Production Example of Crystalline Polyester Dispersion Liquid 1 except that the crystalline polyester resin used was replaced with the amorphous polyester resins as shown in Table 2. The formulations and physical characteristics are shown in Table 2.

Production Example of Amorphous Resin Dispersion Liquid 6

| | |
|---|---|
| Styrene | 79.0 parts |
| n-Butyl acrylate | 19.0 parts |
| β-Carboxyethyl acrylate | 2.0 parts |
| 1,6-Hexanediol diacrylate | 0.4 parts |
| Dodecane thiol (manufactured by Wako Pure Chemical Industries, Ltd.) | 0.7 parts |

The above materials were charged into a flask and mixed and dissolved to obtain a solution. The obtained solution was dispersed and emulsified in an aqueous medium obtained by dissolving 1.0 part of an anionic surfactant (NEOGEN RK, manufactured by Dai-ichi Kogyo Seiyaku Co., Ltd.) in 250 parts of ion-exchanged water. While slowly stirring and mixing for 10 minutes, 50 parts of ion-exchanged water in which 2 parts of ammonium persulfate was dissolved was further added.

Next, after sufficiently replacing the inside of the system with nitrogen, the inside of the system was heated to 70° C. in an oil bath under stirring, and emulsion polymerization was continued as it was continued for 5 hours to obtain an amorphous resin dispersion liquid 6 (solid fraction concentration: 20% by mass).

The volume average particle diameter of the resin particles in the amorphous resin dispersion liquid 6 was 0.19 µm, the glass transition temperature (Tg) was 58° C., and the weight average molecular weight (Mw) was 75,000.

TABLE 2

| Dispersion liquid | Resin | Solid fraction concentration (%) | Volume average particle diameter (μm) |
|---|---|---|---|
| Crystalline polyester dispersion liquid 1 | Crystalline polyester 1 | 20 | 0.17 |
| Crystalline polyester dispersion liquid 2 | Crystalline polyester 2 | 20 | 0.22 |
| Crystalline polyester dispersion liquid 3 | Crystalline polyester 3 | 20 | 0.18 |
| Crystalline polyester dispersion liquid 4 | Crystalline polyester 4 | 20 | 0.21 |
| Crystalline polyester dispersion liquid 5 | Crystalline polyester 5 | 20 | 0.19 |
| Crystalline polyester dispersion liquid 6 | Crystalline polyester 6 | 20 | 0.22 |
| Crystalline polyester dispersion liquid 7 | Crystalline polyester 7 | 20 | 0.21 |
| Crystalline polyester dispersion liquid 8 | Crystalline polyester 8 | 20 | 0.17 |
| Crystalline polyester dispersion liquid 9 | Crystalline polyester 9 | 20 | 0.22 |
| Amorphous resin dispersion liquid 1 | Amorphous polyester 1 | 20 | 0.23 |
| Amorphous resin dispersion liquid 2 | Amorphous polyester 2 | 20 | 0.21 |
| Amorphous resin dispersion liquid 3 | Amorphous polyester 3 | 20 | 0.21 |
| Amorphous resin dispersion liquid 4 | Amorphous polyester 4 | 20 | 0.22 |
| Amorphous resin dispersion liquid 5 | Amorphous polyester 5 | 20 | 0.19 |
| Amorphous resin dispersion liquid 6 | Amorphous polyester 6 | 20 | 0.19 |

Production Example of Wax Dispersion Liquid 1

| | |
|---|---|
| Behenyl behenate (melting point 72° C.) | 50.0 parts |
| Anionic surfactant (NEOGEN RK, manufactured by Dai-ichi Kogyo Seiyaku Co., Ltd.) | 0.3 parts |
| Ion-exchanged water | 150.0 parts |

The above materials were mixed, heated to 95° C., and dispersed using a homogenizer (ULTRATARAX T50, manufactured by IKA). Then, dispersion treatment was performed with a Manton-Gaulin high-pressure homogenizer (manufactured by Gaulin Co., Ltd.) to prepare a wax dispersion liquid 1 (solid fraction concentration: 20% by mass) in which wax particles were dispersed. The volume average particle diameter of the obtained wax particles was 0.22 μm.

Production Example of Wax Dispersion Liquid 2

A wax dispersion liquid 2 (solid fraction concentration: 20% by mass) was obtained in the same manner as in the production example of the wax dispersion liquid 1 except that the wax used was a hydrocarbon wax (melting point 72° C.).

Production Example of Colorant Dispersion Liquid 1

| | |
|---|---|
| C.I. Pigment Yellow 155 | 1,000 parts |
| Anionic surfactant | 150 parts |
| Ion-exchanged water | 9,000 parts |

The above materials were mixed and dissolved, and then dispersed using a high-pressure impact disperser to prepare a colorant dispersion liquid 1 (solid fraction concentration: 20% by mass). The volume average particle diameter of the obtained colorant particles was 0.16 μm.

Production Example of Powder Adhesive Particles 1

| | |
|---|---|
| Amorphous resin dispersion liquid 1 (solid fraction 20% by mass) | 150.0 parts |
| Crystalline polyester dispersion liquid 1 (solid fraction 20% by mass) | 65.0 parts |
| Wax dispersion liquid 1 (solid fraction 20% by mass) | 20.0 parts |
| Colorant dispersion liquid 1 (solid fraction 20% by mass) | 0.1 part |

The above materials were put into a beaker, adjusted so that the total number of parts of water was 250, and then the temperature was adjusted to 30.0° C. Then, using a homogenizer (ULTRATARAX T50 manufactured by IKA), the mixture was mixed by stirring at 5,000 rpm for 1 minute.

Further, 10.0 parts of a 2.0 mass % aqueous solution of aluminum chloride, which is a polyvalent metal compound, was gradually added as a flocculant. The raw material dispersion liquid was transferred to a polymerization vessel equipped with a stirrer and a thermometer, heated to 50.0° C. with a mantle heater, and stirred to promote the growth of cohesion particles.

After 60 minutes, 200.0 parts of a 5.0% by mass aqueous solution of ethylenediaminetetraacetic acid (EDTA) was added to prepare an cohesion particle dispersion liquid 1. Subsequently, the cohesion particle dispersion liquid 1 was adjusted to pH 8.0 with a 0.1 mol/L aqueous solution of sodium hydroxide, and then the cohesion particle dispersion liquid 1 was heated to 80.0° C. and allowed to stand for 180 minutes. The cohesion particles were coalesced.

After 180 minutes, a powder adhesive particle dispersion liquid 1 in which powder adhesive particles were dispersed was obtained. After cooling to 40° C. or lower at a temperature lowering rate of 300° C./min, the powder adhesive particle dispersion liquid 1 was filtered and washed through with ion-exchanged water, and when the conductivity of the filtrate became 50 mS or less, the cake-shaped powder adhesive particles were taken out.

Next, the cake-shaped powder adhesive particles were put into ion-exchanged water taken in an amount of 20 times the mass of the powder adhesive particles, stirred by a three-one motor, filtered again when the powder adhesive particles were sufficiently loosened, washed with water, and subjected to solid-liquid separation. The obtained cake-like powder adhesive particles were pulverized with a sample mill and dried in an oven at 40° C. for 24 hours.

Further, the obtained powder was pulverized with a sample mill and then vacuum dried in an oven at 50° C. for 5 hours to obtain powder adhesive particles 1.

Production Example of Powder Adhesive 1

0.5 parts of the following inorganic fine particles A1, 0.3 parts of the following fine particles B1, and 0.8 parts of hydrophobic silica fine particles that were obtained by treating silica fine particles having a number average diameter of primary particles of 12 nm with silicone oil and had a BET specific surface area value of 120 m$^2$/g after the treatment were added to 100 parts of the powder adhesive particles 1, and mixing was performed using an FM mixer (manufactured by Nippon Coke Industries Co., Ltd.) to obtain a powder adhesive 1.

The physical characteristics of the obtained powder adhesive 1 are shown in Tables 7 and 9.

Inorganic Fine Particles A

The types and physical characteristics of the inorganic fine particles A used are shown in Table 3.

TABLE 3

| Inorganic fine particles A | Type | Number average particle diameter of primary particles (nm) |
|---|---|---|
| Inorganic fine particles A1 | Sol-gel silica | 100 |
| Inorganic fine particles A2 | Sol-gel silica | 40 |
| Inorganic fine particles A3 | Sol-gel silica | 190 |

Particles B

The types and physical characteristics of the fine particles B used are shown in Table 4.

TABLE 4

| | Type | Number average particle diameter of primary particles (nm) | Volume resistivity (Ωm) |
|---|---|---|---|
| Fine particles B1 | Strontium titanate | 35 | 3.4 × 10$^6$ |
| Fine particles B2 | Titanium oxide | 10 | 3.0 × 10$^4$ |
| Fine particles B3 | Silicone | 50 | 7.7 × 10$^5$ |

Production Examples of Powder Adhesives 2 to 13 and 15 to 32

Powder adhesives 2 to 13 and 15 to 32 were obtained in the same manner as in the Production Example of Powder Adhesive Particles 1 and the Production Example of Powder Adhesive 1 except that the types and amounts of the amorphous resin dispersion liquid, crystalline polyester dispersion liquid, wax dispersion liquid, colorant dispersion liquid, and polyvalent metal compound used, and the temperature when the cohesion particles were coalesced were changed as shown in Table 5, and the types and amounts of the inorganic fine particles A and the fine particles B were changed as shown in Table 6. The physical characteristics are shown in Tables 7 and 9.

Production Example of Powder Adhesive 14

| Amorphous polyester resin 1 | 30.0 parts |
| Crystalline polyester resin 1 | 13.0 parts |
| Behenyl behenate (melting point 72° C.) | 4.0 parts |
| Aluminum chloride | 0.2 parts |

The above materials were premixed with an FM mixer (manufactured by Nippon Coke Industries Co., Ltd.) and then melt-kneaded by using a twin-screw extruder (trade name: PCM-30, manufactured by Ikegai Iron Works Co., Ltd.) and setting the temperature so that the temperature of the molten product at the discharge port was 150° C.

The obtained kneaded product was cooled, coarsely pulverized with a hammer mill, and then finely pulverized using a pulverizer (trade name: TURBO MILL T250, manufactured by Turbo Industries, Ltd.). The obtained finely pulverized powder was classified using a multi-division classifier utilizing the Coanda effect to obtain powder adhesive particles 14.

A powder adhesive 14 was obtained in the same manner as in the Production Example of Powder Adhesive 1 except that the type and amount of the external additives used were changed as shown in Table 6. The physical characteristics of the powder adhesive 14 are shown in Tables 7 and 9.

TABLE 5

| Powder adhesive particles No. | Amorphous resin dispersion liquid | | Crystalline polyester dispersion liquid | | Wax dispersion liquid | |
|---|---|---|---|---|---|---|
| | Type | Number of parts | Type | Number of parts | Type | Number of parts |
| 1 | Amorphous resin dispersion liquid 1 | 150.0 | Crystalline polyester dispersion liquid 1 | 65.0 | Wax dispersion liquid 1 | 20.00 |
| 2 | Amorphous resin dispersion liquid 1 | 150.0 | Crystalline polyester dispersion liquid 1 | 105.0 | Wax dispersion liquid 1 | 20.00 |
| 3 | Amorphous resin dispersion liquid 1 | 150.0 | Crystalline polyester dispersion liquid 2 | 65.0 | Wax dispersion liquid 1 | 20.00 |
| 4 | Amorphous resin dispersion liquid 1 | 150.0 | Crystalline polyester dispersion liquid 3 | 65.0 | Wax dispersion liquid 1 | 20.00 |
| 5 | Amorphous resin dispersion liquid 1 | 150.0 | Crystalline polyester dispersion liquid 1 | 65.0 | Wax dispersion liquid 1 | 20.00 |
| 6 | Amorphous resin dispersion liquid 1 | 150.0 | Crystalline polyester dispersion liquid 1 | 65.0 | Wax dispersion liquid 1 | 20.00 |
| 7 | Amorphous resin dispersion liquid 1 | 150.0 | Crystalline polyester dispersion liquid 1 | 65.0 | Wax dispersion liquid 1 | 20.00 |
| 8 | Amorphous resin dispersion liquid 1 | 150.0 | Crystalline polyester dispersion liquid 1 | 65.0 | Wax dispersion liquid 1 | 20.00 |
| 9 | Amorphous resin dispersion liquid 1 | 150.0 | Crystalline polyester dispersion liquid 1 | 65.0 | Wax dispersion liquid 1 | 20.00 |
| 10 | Amorphous resin dispersion liquid 1 | 150.0 | Crystalline polyester dispersion liquid 1 | 65.0 | Wax dispersion liquid 1 | 20.00 |

TABLE 5-continued

| | | | | | | |
|---|---|---|---|---|---|---|
| 11 | Amorphous resin dispersion liquid 1 | 150.0 | Crystalline polyester dispersion liquid 1 | 65.0 | Wax dispersion liquid 1 | 20.00 |
| 12 | Amorphous resin dispersion liquid 1 | 150.0 | Crystalline polyester dispersion liquid 1 | 65.0 | Wax dispersion liquid 1 | 20.00 |
| 13 | Amorphous resin dispersion liquid 1 | 150.0 | Crystalline polyester dispersion liquid 1 | 65.0 | Wax dispersion liquid 1 | 20.00 |
| 14 | Preparation by pulverization method | | | | | |
| 15 | Amorphous resin dispersion liquid 1 | 150.0 | Crystalline polyester dispersion liquid 1 | 65.0 | Wax dispersion liquid 1 | 20.00 |
| 16 | Amorphous resin dispersion liquid 1 | 150.0 | Crystalline polyester dispersion liquid 1 | 65.0 | Wax dispersion liquid 1 | 20.00 |
| 17 | Amorphous resin dispersion liquid 1 | 150.0 | Crystalline polyester dispersion liquid 1 | 65.0 | Wax dispersion liquid 1 | 20.00 |
| 18 | Amorphous resin dispersion liquid 5 | 150.0 | Crystalline polyester dispersion liquid 1 | 65.0 | Wax dispersion liquid 1 | 20.00 |
| 19 | Amorphous resin dispersion liquid 1 | 150.0 | Crystalline polyester dispersion liquid 4 | 65.0 | Wax dispersion liquid 1 | 20.00 |
| 20 | Amorphous resin dispersion liquid 1 | 150.0 | Crystalline polyester dispersion liquid 5 | 65.0 | Wax dispersion liquid 1 | 20.00 |
| 21 | Amorphous resin dispersion liquid 2 | 150.0 | Crystalline polyester dispersion liquid 1 | 65.0 | Wax dispersion liquid 1 | 20.00 |
| 22 | Amorphous resin dispersion liquid 1 | 150.0 | Crystalline polyester dispersion liquid 6 | 65.0 | Wax dispersion liquid 1 | 20.00 |
| 23 | Amorphous resin dispersion liquid 3 | 150.0 | Crystalline polyester dispersion liquid 1 | 65.0 | Wax dispersion liquid 1 | 20.00 |
| 24 | Amorphous resin dispersion liquid 1 | 150.0 | Crystalline polyester dispersion liquid 1 | 52.0 | Wax dispersion liquid 1 | 20.00 |
| 25 | Amorphous resin dispersion liquid 4 | 150.0 | Crystalline polyester dispersion liquid 7 | 52.0 | Wax dispersion liquid 1 | 20.00 |
| 26 | Amorphous resin dispersion liquid 5 | 150.0 | Crystalline polyester dispersion liquid 8 | 52.0 | Wax dispersion liquid 1 | 20.00 |
| 27 | Amorphous resin dispersion liquid 1 | 150.0 | Crystalline polyester dispersion liquid 1 | 44.0 | Wax dispersion liquid 1 | 20.00 |
| 28 | Amorphous resin dispersion liquid 1 | 150.0 | Crystalline polyester dispersion liquid 1 | 16.0 | Wax dispersion liquid 1 | 20.00 |
| 29 | Amorphous resin dispersion liquid 1 | 150.0 | Crystalline polyester dispersion liquid 4 | 16.0 | Wax dispersion liquid 1 | 20.00 |
| 30 | Amorphous resin dispersion liquid 5 | 150.0 | Crystalline polyester dispersion liquid 7 | 65.0 | Wax dispersion liquid 1 | 20.00 |
| 31 | Amorphous resin dispersion liquid 1 | 150.0 | Crystalline polyester dispersion liquid 9 | 65.0 | Wax dispersion liquid 1 | 20.00 |
| 32 | Amorphous resin dispersion liquid 5 | 150.0 | — | 0 | Wax dispersion liquid 2 | 58.00 |

| Powder adhesive particles No. | Colorant dispersion liquid 1 Number of parts | Polyvalent metal compound Type | Polyvalent metal compound Number of parts | Polyvalent metal compound Aqueous solution concentration | Temperature at time of coalescence (° C.) |
|---|---|---|---|---|---|
| 1 | 0.1 | Aluminum chloride | 10.0 | 2.0 | 80 |
| 2 | 0.1 | Aluminum chloride | 10.0 | 2.0 | 80 |
| 3 | 0.1 | Aluminum chloride | 10.0 | 2.0 | 80 |
| 4 | 0.1 | Aluminum chloride | 10.0 | 2.0 | 80 |
| 5 | 0.1 | Aluminum chloride | 10.0 | 2.0 | 80 |
| 6 | 0.1 | Aluminum chloride | 10.0 | 2.0 | 80 |
| 7 | 0.1 | Aluminum chloride | 10.0 | 2.0 | 80 |
| 8 | 0.1 | Aluminum chloride | 10.0 | 2.0 | 80 |
| 9 | 0.1 | Aluminum chloride | 10.0 | 2.0 | 80 |
| 10 | 0.1 | Aluminum chloride | 10.0 | 2.0 | 80 |
| 11 | — | Aluminum chloride | 10.0 | 2.0 | 80 |
| 12 | — | Aluminum chloride | 10.0 | 2.0 | 75 |
| 13 | — | Aluminum chloride | 10.0 | 2.0 | 68 |
| 14 | Preparation by pulverization method | | | | |
| 15 | — | Iron chloride | 10.0 | 2.0 | 80 |

TABLE 5-continued

| | | | | | |
|---|---|---|---|---|---|
| 16 | — | Magnesium chloride | 10.0 | 2.0 | 80 |
| 17 | — | Sodium chloride | 10.0 | 2.0 | 80 |
| 18 | — | Aluminum chloride | 10.0 | 2.0 | 80 |
| 19 | — | Aluminum chloride | 10.0 | 2.0 | 80 |
| 20 | — | Aluminum chloride | 10.0 | 2.0 | 80 |
| 21 | — | Aluminum chloride | 10.0 | 2.0 | 80 |
| 22 | — | Aluminum chloride | 10.0 | 2.0 | 80 |
| 23 | — | Aluminum chloride | 10.0 | 2.0 | 80 |
| 24 | — | Aluminum chloride | 10.0 | 2.0 | 80 |
| 25 | — | Aluminum chloride | 10.0 | 2.0 | 80 |
| 26 | — | Sodium chloride | 10.0 | 2.0 | 63 |
| 27 | — | Aluminum chloride | 10.0 | 2.0 | 80 |
| 28 | — | Aluminum chloride | 10.0 | 2.0 | 80 |
| 29 | — | Aluminum chloride | 10.0 | 2.0 | 80 |
| 30 | — | Aluminum chloride | 10.0 | 2.0 | 80 |
| 31 | — | Aluminum chloride | 10.0 | 2.0 | 80 |
| 32 | — | Aluminum chloride | 10.0 | 2.0 | 80 |

The unit of the aqueous solution concentration of the polyvalent metal compound is % by mass.

TABLE 6

| | Inorganic fine particles A | | Fine particles B | | Silica fine particles (number average particle diameter of primary particles is 12 nm) |
|---|---|---|---|---|---|
| Powder adhesive | Type | Number of parts | Type | Number of parts | Number of parts |
| Powder adhesive 1 | Inorganic fine particles A1 | 0.5 | Fine particles B1 | 0.3 | 0.8 |
| Powder adhesive 2 | Inorganic fine particles A1 | 0.5 | Fine particles B1 | 0.3 | 0.8 |
| Powder adhesive 3 | Inorganic fine particles A1 | 0.5 | Fine particles B1 | 0.3 | 0.8 |
| Powder adhesive 4 | Inorganic fine particles A1 | 0.5 | Fine particles B1 | 0.3 | 0.8 |
| Powder adhesive 5 | Inorganic fine particles A1 | 0.5 | Fine particles B2 | 0.1 | 0.8 |
| Powder adhesive 6 | Inorganic fine particles A1 | 0.5 | Fine particles B3 | 0.4 | 0.8 |
| Powder adhesive 7 | Inorganic fine particles A1 | 0.5 | — | — | 0.8 |
| Powder adhesive 8 | Inorganic fine particles A2 | 0.2 | Fine particles B1 | 0.3 | 0.8 |
| Powder adhesive 9 | Inorganic fine particles A3 | 0.3 | Fine particles B1 | 0.3 | 0.8 |
| Powder adhesive 10 | — | — | Fine particles B1 | 0.3 | 0.8 |
| Powder adhesive 11 | Inorganic fine particles A1 | 0.5 | Fine particles B1 | 0.3 | 0.8 |
| Powder adhesive 12 | Inorganic fine particles A1 | 0.5 | Fine particles B1 | 0.3 | 0.8 |
| Powder adhesive 13 | Inorganic fine particles A1 | 0.5 | Fine particles B1 | 0.3 | 0.8 |
| Powder adhesive 14 | Inorganic fine particles A1 | 0.5 | Fine particles B1 | 0.3 | 0.8 |
| Powder adhesive 15 | Inorganic fine particles A1 | 0.5 | Fine particles B1 | 0.3 | 0.8 |
| Powder adhesive 16 | Inorganic fine particles A1 | 0.5 | Fine particles B1 | 0.3 | 0.8 |
| Powder adhesive 17 | Inorganic fine particles A1 | 0.5 | Fine particles B1 | 0.3 | 0.8 |
| Powder adhesive 18 | Inorganic fine particles A1 | 0.5 | Fine particles B1 | 0.3 | 0.8 |
| Powder adhesive 19 | Inorganic fine particles A1 | 0.5 | Fine particles B1 | 0.3 | 0.8 |
| Powder adhesive 20 | Inorganic fine particles A1 | 0.5 | Fine particles B1 | 0.3 | 0.8 |
| Powder adhesive 21 | Inorganic fine particles A1 | 0.5 | Fine particles B1 | 0.3 | 0.8 |
| Powder adhesive 22 | Inorganic fine particles A1 | 0.5 | Fine particles B1 | 0.3 | 0.8 |
| Powder adhesive 23 | Inorganic fine particles A1 | 0.5 | Fine particles B1 | 0.3 | 0.8 |
| Powder adhesive 24 | Inorganic fine particles A1 | 0.5 | Fine particles B1 | 0.3 | 0.8 |
| Powder adhesive 25 | Inorganic fine particles A1 | 0.5 | Fine particles B1 | 0.3 | 0.8 |
| Powder adhesive 26 | — | — | — | — | 0.8 |
| Powder adhesive 27 | Inorganic fine particles A1 | 0.5 | Fine particles B1 | 0.3 | 0.8 |
| Powder adhesive 28 | Inorganic fine particles A1 | 0.5 | Fine particles B1 | 0.3 | 0.8 |

TABLE 6-continued

| Powder adhesive | Inorganic fine particles A Type | Number of parts | Fine particles B Type | Number of parts | Silica fine particles (number average particle diameter of primary particles is 12 nm) Number of parts |
|---|---|---|---|---|---|
| Powder adhesive 29 | Inorganic fine particles A1 | 0.5 | Fine particles B1 | 0.3 | 0.8 |
| Powder adhesive 30 | Inorganic fine particles A1 | 0.5 | Fine particles B1 | 0.3 | 0.8 |
| Powder adhesive 31 | Inorganic fine particles A1 | 0.5 | Fine particles B1 | 0.3 | 0.8 |
| Powder adhesive 32 | Inorganic fine particles A1 | 0.5 | Fine particles B1 | 0.3 | 0.8 |

TABLE 7

| Powder adhesive No. | Amount in powder adhesive (% by mass) | | | | | | | Average circularity | Weight average particle diameter (μm) |
|---|---|---|---|---|---|---|---|---|---|
| | Amorphous resin | Crystalline polyester resin | Wax | Colorant | Polyvalent metal compound | Inorganic fine particles A | Fine particles B | | |
| 1 | 63 | 27 | 8.4 | 0.04 | 0.26 | 0.49 | 0.30 | 0.980 | 7.2 |
| 2 | 54 | 37 | 7.1 | 0.04 | 0.19 | 0.49 | 0.30 | 0.981 | 7.1 |
| 3 | 63 | 27 | 8.4 | 0.04 | 0.23 | 0.49 | 0.30 | 0.980 | 7.2 |
| 4 | 63 | 27 | 8.4 | 0.04 | 0.17 | 0.49 | 0.30 | 0.979 | 7.3 |
| 5 | 63 | 27 | 8.4 | 0.04 | 0.29 | 0.49 | 0.10 | 0.980 | 7.3 |
| 6 | 63 | 27 | 8.3 | 0.04 | 0.21 | 0.49 | 0.39 | 0.981 | 7.2 |
| 7 | 63 | 27 | 8.4 | 0.04 | 0.26 | 0.49 | 0 | 0.981 | 7.1 |
| 8 | 63 | 27 | 8.4 | 0.04 | 0.27 | 0.20 | 0.30 | 0.980 | 7.2 |
| 9 | 63 | 27 | 8.4 | 0.04 | 0.26 | 0.30 | 0.30 | 0.981 | 7.4 |
| 10 | 63 | 27 | 8.4 | 0.04 | 0.19 | 0.00 | 0.30 | 0.979 | 7.2 |
| 11 | 63 | 27 | 8.4 | 0 | 0.26 | 0.49 | 0.30 | 0.980 | 7.1 |
| 12 | 63 | 27 | 8.4 | 0 | 0.26 | 0.49 | 0.30 | 0.961 | 7.2 |
| 13 | 63 | 27 | 8.4 | 0 | 0.26 | 0.49 | 0.30 | 0.941 | 7.3 |
| 14 | 62 | 27 | 8.3 | 0 | 0.81 | 0.49 | 0.30 | 0.937 | 7.2 |
| 15 | 63 | 27 | 8.4 | 0 | 0.26 | 0.49 | 0.30 | 0.981 | 7.1 |
| 16 | 63 | 27 | 8.4 | 0 | 0.17 | 0.49 | 0.30 | 0.979 | 7.2 |
| 17 | 63 | 27 | 8.4 | 0 | 0.29 | 0.49 | 0.30 | 0.980 | 7.4 |
| 18 | 63 | 27 | 8.4 | 0 | 0.21 | 0.49 | 0.30 | 0.980 | 7.2 |
| 19 | 63 | 27 | 8.4 | 0 | 0.26 | 0.49 | 0.30 | 0.980 | 7.1 |
| 20 | 63 | 27 | 8.4 | 0 | 0.27 | 0.49 | 0.30 | 0.981 | 7.3 |
| 21 | 63 | 27 | 8.4 | 0 | 0.26 | 0.49 | 0.30 | 0.980 | 7.2 |
| 22 | 63 | 27 | 8.4 | 0 | 0.23 | 0.49 | 0.30 | 0.980 | 7.2 |
| 23 | 63 | 27 | 8.4 | 0 | 0.26 | 0.49 | 0.30 | 0.979 | 7.2 |
| 24 | 66 | 23 | 8.8 | 0 | 0.29 | 0.49 | 0.30 | 0.980 | 7.2 |
| 25 | 66 | 23 | 8.9 | 0 | 0.18 | 0.49 | 0.30 | 0.981 | 7.2 |
| 26 | 67 | 23 | 8.9 | 0 | 0.31 | 0 | 0 | 0.938 | 7.3 |
| 27 | 69 | 20 | 9.2 | 0 | 0.23 | 0.49 | 0.30 | 0.980 | 7.2 |
| 28 | 79 | 8 | 10.5 | 0 | 0.34 | 0.49 | 0.30 | 0.980 | 7.1 |
| 29 | 79 | 8 | 10.5 | 0 | 0.34 | 0.49 | 0.30 | 0.981 | 7.2 |
| 30 | 63 | 27 | 8.4 | 0 | 0.26 | 0.49 | 0.30 | 0.980 | 7.3 |
| 31 | 63 | 27 | 8.4 | 0 | 0.26 | 0.49 | 0.30 | 0.980 | 7.2 |
| 32 | 71 | 0 | 27.4 | 0 | 0.33 | 0.49 | 0.30 | 0.981 | 7.2 |

Production Example of Toner Particles 1

| | |
|---|---|
| Amorphous resin dispersion liquid 1 (solid fraction 20% by mass) | 150.0 parts |
| Crystalline polyester dispersion liquid 1 (solid fraction 20% by mass) | 22.0 parts |
| Wax dispersion liquid 1 (solid fraction 20% by mass) | 20.0 parts |
| Colorant dispersion liquid 1 (solid fraction 20% by mass) | 15.0 parts |

The above materials were put into a beaker and adjusted so that the total number of parts of water was 250, and then the temperature was adjusted to 30.0° C. Then, using a homogenizer (ULTRATARAX T50, manufactured by IKA), the components were mixed by stirring at 5000 rpm for 1 minute.

Further, 10.0 parts of a 2.0 mass % aqueous solution of aluminum chloride, which is a polyvalent metal compound, was gradually added as a flocculant. The raw material dispersion liquid was transferred to a polymerization vessel equipped with a stirrer and a thermometer, heated to 50.0° C. with a mantle heater, and stirred to promote the growth of cohesion particles.

After 60 minutes, 200.0 parts of a 5.0% by mass aqueous solution of ethylenediaminetetraacetic acid (EDTA) was added to prepare an cohesion particle dispersion liquid 1. Subsequently, the cohesion particle dispersion liquid 1 was adjusted to pH 8.0 with a 0.1 mol/L aqueous solution of sodium hydroxide, and then the cohesion particle dispersion liquid 1 was heated to 80.0° C. and allowed to stand for 180 minutes. The cohesion particles were coalesced.

After 180 minutes, a toner particle dispersion liquid 1 in which the powder adhesive particles were dispersed was obtained. After cooling to 40° C. or lower at a temperature lowering rate of 300° C./min, the toner particle dispersion liquid 1 was filtered and washed through with ion-exchanged water, and when the conductivity of the filtrate became 50 mS or less, the cake-shaped toner particles were taken out.

Next, the cake-shaped toner particles were put into ion-exchanged water taken in an amount of 20 times the mass of the toner particles, stirred by a three-one motor, filtered again when the toner particles were sufficiently loosened, washed with water and subjected to solid-liquid separation. The obtained cake-like toner particles were pulverized with a sample mill and dried in an oven at 40° C. for 24 hours. Further, the obtained powder was pulverized with a sample mill and then vacuum dried in an oven at 50° C. for 5 hours to obtain toner particles 1.

Production Example of Toner 1

0.8 parts of hydrophobic silica fine particles that were obtained by treating silica fine particles having a number average diameter of primary particles of 12 nm with silicone oil and had a BET specific surface area value of 120 $m^2/g$ after the treatment were added to 100 parts of the toner particles 1, and mixing was performed using an FM mixer (manufactured by Nippon Coke Industries Co., Ltd.) to obtain a toner 1.

The physical characteristics of the obtained toner 1 are shown in Tables 8 and 9.

Production Examples of Toners 2 to 14

Toners 2 to 14 were obtained in the same manner as in the Production Example of Toner Particle 1 and the Production Example of Toner 1, except that the types and amounts of the amorphous resin dispersion liquid, crystalline polyester dispersion liquid, wax dispersion liquid, colorant dispersion liquid, and polyvalent metal compound used were changed as shown in Table 8. The physical characteristics of the toners 2 to 14 are shown in Tables 8 and 9.

TABLE 8

| Toner particles | Amorphous resin dispersion liquid | | Crystalline polyester dispersion liquid | | Wax dispersion liquid 1 | Colorant dispersion liquid 1 |
|---|---|---|---|---|---|---|
| | Type | Number of parts | Type | Number of parts | Number of parts | Number of parts |
| Toner particles 1 | Amorphous resin dispersion liquid 1 | 150.0 | Crystalline polyester dispersion liquid 1 | 22.0 | 20.0 | 15.0 |
| Toner particles 2 | Amorphous resin dispersion liquid 1 | 150.0 | Crystalline polyester dispersion liquid 1 | 28.0 | 20.0 | 15.0 |
| Toner particles 3 | Amorphous resin dispersion liquid 1 | 150.0 | Crystalline polyester dispersion liquid 2 | 35.0 | 20.0 | 15.0 |
| Toner particles 4 | Amorphous resin dispersion liquid 1 | 150.0 | Crystalline polyester dispersion liquid 3 | 40.0 | 20.0 | 15.0 |
| Toner particles 5 | Amorphous resin dispersion liquid 1 | 150.0 | Crystalline polyester dispersion liquid 1 | 50.0 | 20.0 | 15.0 |
| Toner particles 6 | Amorphous resin dispersion liquid 1 | 150.0 | Crystalline polyester dispersion liquid 1 | 10.0 | 20.0 | 15.0 |
| Toner particles 7 | Amorphous resin dispersion liquid 5 | 150.0 | Crystalline polyester dispersion liquid 1 | 57.0 | 20.0 | 15.0 |
| Toner particles 8 | Amorphous resin dispersion liquid 1 | 150.0 | Crystalline polyester dispersion liquid 1 | 7.0 | 20.0 | 15.0 |
| Toner particles 9 | Amorphous resin dispersion liquid 1 | 150.0 | Crystalline polyester dispersion liquid 1 | 17.0 | 20.0 | 15.0 |
| Toner particles 10 | Amorphous resin dispersion liquid 1 | 150.0 | — | 0.0 | 20.0 | 15.0 |
| Toner particles 11 | Amorphous resin dispersion liquid 4 | 150.0 | Crystalline polyester dispersion liquid 1 | 58.0 | 20.0 | 15.0 |
| Toner particles 12 | Amorphous resin dispersion liquid 6 | 150.0 | Crystalline polyester dispersion liquid 1 | 22.0 | 20.0 | 15.0 |
| Toner particles 13 | Amorphous resin dispersion liquid 6 | 150.0 | Crystalline polyester dispersion liquid 1 | 26.0 | 20.0 | 15.0 |

| Toner particles | Polyvalent metal compound | | | Content of crystalline polyester resin in toner (by mass %) | Weight average particle diameter (μm) |
|---|---|---|---|---|---|
| | Type | Number of parts | Aqueous solution concentration | | |
| Toner particles 1 | Aluminum chloride | 10.0 | 2.0 | 10 | 7.2 |
| Toner particles 2 | Aluminum chloride | 10.0 | 2.0 | 13 | 7.1 |
| Toner particles 3 | Aluminum chloride | 10.0 | 2.0 | 15 | 7.2 |
| Toner particles 4 | Aluminum chloride | 10.0 | 2.0 | 17 | 7.4 |
| Toner particles 5 | Aluminum chloride | 10.0 | 2.0 | 20 | 7.1 |

TABLE 8-continued

| | | | | | |
|---|---|---|---|---|---|
| Toner particles 6 | Aluminum chloride | 10.0 | 2.0 | 13 | 7.2 |
| Toner particles 7 | Aluminum chloride | 10.0 | 2.0 | 23 | 7.3 |
| Toner particles 8 | Aluminum chloride | 10.0 | 2.0 | 3 | 7.2 |
| Toner particles 9 | Aluminum chloride | 10.0 | 2.0 | 8 | 7.4 |
| Toner particles 10 | Aluminum chloride | 10.0 | 2.0 | 0 | 7.2 |
| Toner particles 11 | Aluminum chloride | 10.0 | 2.0 | 23 | 7.1 |
| Toner particles 12 | Aluminum chloride | 10.0 | 2.0 | 10 | 7.2 |
| Toner particles 13 | Aluminum chloride | 10.0 | 2.0 | 12 | 7.3 |

The unit of the aqueous solution concentration of the polyvalent metal compound is % by mass.

A developer set was prepared using the obtained powder adhesive and toner in the combination shown in Table 9. Developer sets 1 to 30 were used as examples, and comparative developer sets 1 to 7 were used as comparative examples.

(81.0 g/m$^2$) (manufactured by Canon Marketing Japan Inc.) was used. The results are shown in Table 10.

Evaluation of Adhesive Strength and Hot Offset Resistance

Preparation of Sample Image for Evaluation

A commercially available Canon laser beam printer LBP712Ci was used to prepare a sample image for evaluation. By changing the software, the printer was modified so

TABLE 9

| | | Powder adhesive | Toner | Gb'(100) (Pa) | Gt'(100) (Pa) | Gt'(100)/ Gb'(100) | tanδ | Tt − Tb (° C.) |
|---|---|---|---|---|---|---|---|---|
| Example 1 | Developer set 1 | Powder adhesive 1 | Toner 1 | 4.4 × 10$^3$ | 3.8 × 10$^4$ | 8.6 | 1.5 | 22 |
| Example 2 | Developer set 2 | Powder adhesive 2 | Toner 1 | 1.8 × 10$^3$ | 3.8 × 10$^4$ | 21.1 | 1.9 | 28 |
| Example 3 | Developer set 3 | Powder adhesive 3 | Toner 1 | 2.8 × 10$^3$ | 3.8 × 10$^4$ | 13.6 | 1.6 | 25 |
| Example 4 | Developer set 4 | Powder adhesive 4 | Toner 1 | 8.2 × 10$^3$ | 3.8 × 10$^4$ | 4.6 | 1.2 | 17 |
| Example 5 | Developer set 5 | Powder adhesive 5 | Toner 1 | 4.4 × 10$^3$ | 3.8 × 10$^4$ | 8.6 | 1.5 | 22 |
| Example 6 | Developer set 6 | Powder adhesive 6 | Toner 1 | 4.4 × 10$^3$ | 3.8 × 10$^4$ | 8.6 | 1.5 | 22 |
| Example 7 | Developer set 7 | Powder adhesive 7 | Toner 1 | 4.4 × 10$^3$ | 3.8 × 10$^4$ | 8.6 | 1.5 | 22 |
| Example 8 | Developer set 8 | Powder adhesive 8 | Toner 1 | 4.4 × 10$^3$ | 3.8 × 10$^4$ | 8.6 | 1.5 | 22 |
| Example 9 | Developer set 9 | Powder adhesive 9 | Toner 1 | 4.4 × 10$^3$ | 3.8 × 10$^4$ | 8.6 | 1.5 | 22 |
| Example 10 | Developer set 10 | Powder adhesive 10 | Toner 1 | 4.4 × 10$^3$ | 3.8 × 10$^4$ | 8.6 | 1.5 | 22 |
| Example 11 | Developer set 11 | Powder adhesive 11 | Toner 1 | 4.4 × 10$^3$ | 3.8 × 10$^4$ | 8.6 | 1.5 | 22 |
| Example 12 | Developer set 12 | Powder adhesive 12 | Toner 1 | 4.4 × 10$^3$ | 3.8 × 10$^4$ | 8.6 | 1.5 | 22 |
| Example 13 | Developer set 13 | Powder adhesive 13 | Toner 1 | 4.4 × 10$^3$ | 3.8 × 10$^4$ | 8.6 | 1.5 | 22 |
| Example 14 | Developer set 14 | Powder adhesive 14 | Toner 1 | 4.4 × 10$^3$ | 3.8 × 10$^4$ | 8.6 | 1.5 | 22 |
| Example 15 | Developer set 15 | Powder adhesive 15 | Toner 1 | 4.4 × 10$^3$ | 3.8 × 10$^4$ | 8.6 | 1.5 | 23 |
| Example 16 | Developer set 16 | Powder adhesive 16 | Toner 1 | 4.4 × 10$^3$ | 3.8 × 10$^4$ | 8.6 | 1.5 | 20 |
| Example 17 | Developer set 17 | Powder adhesive 17 | Toner 1 | 4.4 × 10$^3$ | 3.8 × 10$^4$ | 8.6 | 1.5 | 20 |
| Example 18 | Developer set 18 | Powder adhesive 18 | Toner 1 | 5.2 × 10$^3$ | 3.8 × 10$^4$ | 7.3 | 2.5 | 21 |
| Example 19 | Developer set 19 | Powder adhesive 19 | Toner 1 | 3.9 × 10$^3$ | 3.8 × 10$^4$ | 9.7 | 1.8 | 19 |
| Example 20 | Developer set 20 | Powder adhesive 20 | Toner 1 | 4.6 × 10$^3$ | 3.8 × 10$^4$ | 8.3 | 1.4 | 22 |
| Example 21 | Developer set 21 | Powder adhesive 21 | Toner 1 | 4.1 × 10$^3$ | 3.8 × 10$^4$ | 9.3 | 3.1 | 22 |
| Example 22 | Developer set 22 | Powder adhesive 22 | Toner 1 | 3.7 × 10$^3$ | 3.8 × 10$^4$ | 10.3 | 3.5 | 19 |
| Example 23 | Developer set 23 | Powder adhesive 1 | Toner 2 | 4.4 × 10$^3$ | 2.3 × 10$^4$ | 5.2 | 1.5 | 13 |
| Example 24 | Developer set 24 | Powder adhesive 1 | Toner 3 | 4.4 × 10$^3$ | 1.8 × 10$^4$ | 4.1 | 1.5 | 9 |
| Example 25 | Developer set 25 | Powder adhesive 1 | Toner 4 | 4.4 × 10$^3$ | 1.6 × 10$^4$ | 3.6 | 1.5 | 9 |
| Example 26 | Developer set 26 | Powder adhesive 1 | Toner 5 | 4.4 × 10$^3$ | 7.7 × 10$^3$ | 1.8 | 1.5 | 9 |
| Example 27 | Developer set 27 | Powder adhesive 23 | Toner 6 | 1.1 × 10$^4$ | 2.1 × 10$^4$ | 1.9 | 1.3 | 9 |
| Example 28 | Developer set 28 | Powder adhesive 24 | Toner 6 | 1.4 × 10$^4$ | 2.1 × 10$^4$ | 1.5 | 1.3 | 8 |
| Example 29 | Developer set 29 | Powder adhesive 25 | Toner 1 | 2.2 × 10$^4$ | 3.8 × 10$^4$ | 1.7 | 0.9 | 8 |
| Example 30 | Developer set 30 | Powder adhesive 26 | Toner 7 | 2.3 × 10$^4$ | 3.8 × 10$^4$ | 1.7 | 3.2 | 8 |
| Comparative Example 1 | Comparative developer set 1 | Powder adhesive 27 | Toner 8 | 2.9 × 10$^4$ | 6.1 × 10$^4$ | 2.1 | 1.1 | 9 |
| Comparative Example 2 | Comparative developer set 2 | Powder adhesive 28 | Toner 9 | 7.3 × 10$^4$ | 7.5 × 10$^4$ | 1.0 | 1.0 | 2 |
| Comparative Example 3 | Comparative developer set 3 | Powder adhesive 29 | Toner 10 | 4.4 × 10$^4$ | 8.9 × 10$^4$ | 2.0 | 0.9 | 9 |
| Comparative Example 4 | Comparative developer set 4 | Powder adhesive 1 | Toner 11 | 4.4 × 10$^3$ | 4.7 × 10$^3$ | 1.1 | 1.5 | 3 |
| Comparative Example 5 | Comparative developer set 5 | Powder adhesive 30 | Toner 12 | 1.1 × 10$^5$ | 5.6 × 10$^5$ | 5.1 | 2.8 | 8 |
| Comparative Example 6 | Comparative developer set 6 | Powder adhesive 31 | Toner 13 | 8.6 × 10$^4$ | 4.8 × 10$^5$ | 5.6 | 1.5 | 6 |
| Comparative Example 7 | Comparative developer set 7 | Powder adhesive 32 | Toner 12 | 1.2 × 10$^5$ | 5.6 × 10$^5$ | 4.7 | 3.9 | 8 |

The performance of the obtained developer sets 1 to 30 and the comparative developer sets 1 to 7 was evaluated according to the following methods. All evaluations were performed in a normal temperature and normal humidity (25° C./50% RH) environment, and A4 size GFC-081 paper that it could work even if all the cartridges were not set. In addition, the laid-on level of powder adhesive and the toner (mg/cm$^2$) could be adjusted arbitrarily.

The toner contained in the cyan cartridge of LBP712Ci was extracted, and the cartridge was filled with 150 g of the toner of each developer set and set in the cyan station.

Further, the toner contained in the black cartridge was extracted, and the cartridge was filled with 150 g of the powder adhesive of each developer set, and set in the black station.

Figure 8:
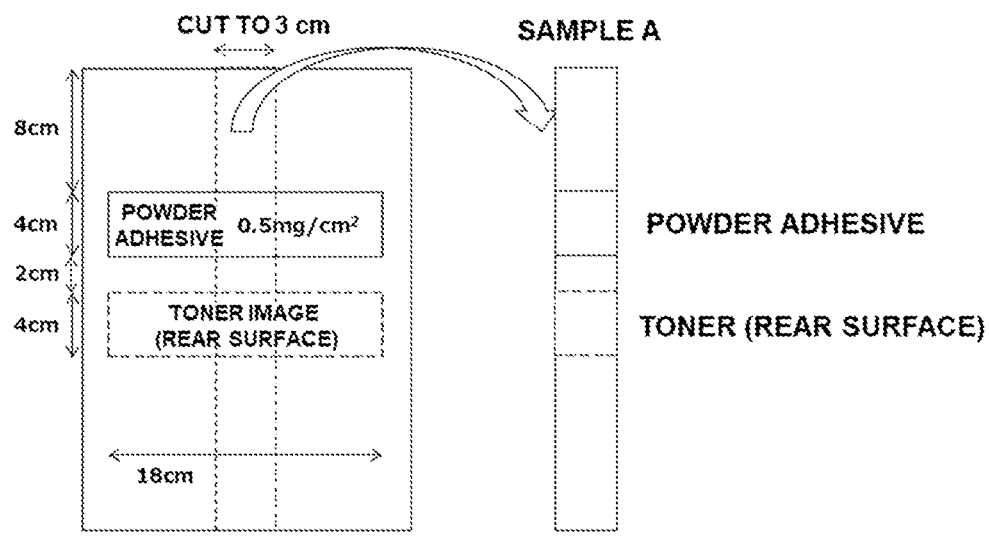
FIG. 8 is a schematic diagram of an evaluation sample.
Figure 8:
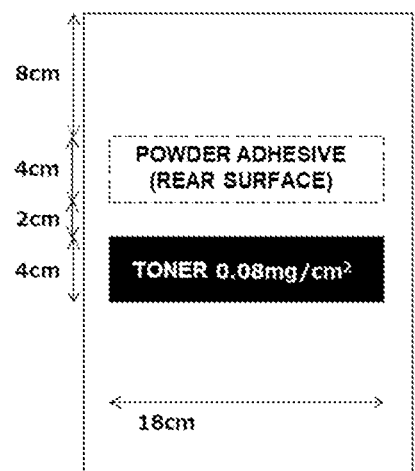

Using this printer, the powder adhesive was printed at a laid-on level of 0.5 mg/cm² on a 4 cm area by opening a margin of 8 cm at the tip of one side (taken as a bonding surface) of the paper, as shown in FIG. 8, and then the toner was printed at a laid-on level of 0.08 mg/cm² on a 4 cm area by opening a margin of 14 cm on the surface (taken as the toner printing surface) opposite to the surface on which the powder adhesive was formed (image A).

Figure 9:
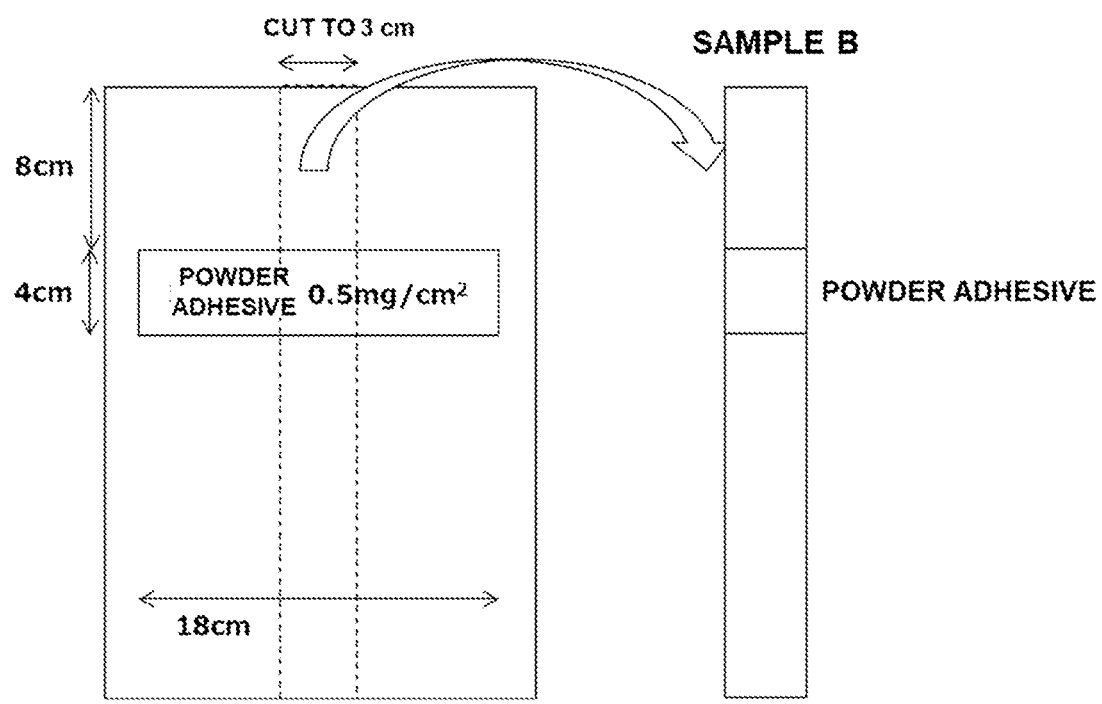
FIG. 9 is a schematic diagram of an evaluation sample.

Further, as shown in FIG. 9, the powder adhesive was printed at a laid-on level of 0.5 mg/cm² on a 4 cm area by opening a front end margin of 8 cm on another paper (image B).

The obtained image A was cut to a width of 3 cm to obtain sample A. Similarly, the image B was cut to obtain sample B.

Evaluation of Bonding Temperature of Powder Adhesive

Figure 10:
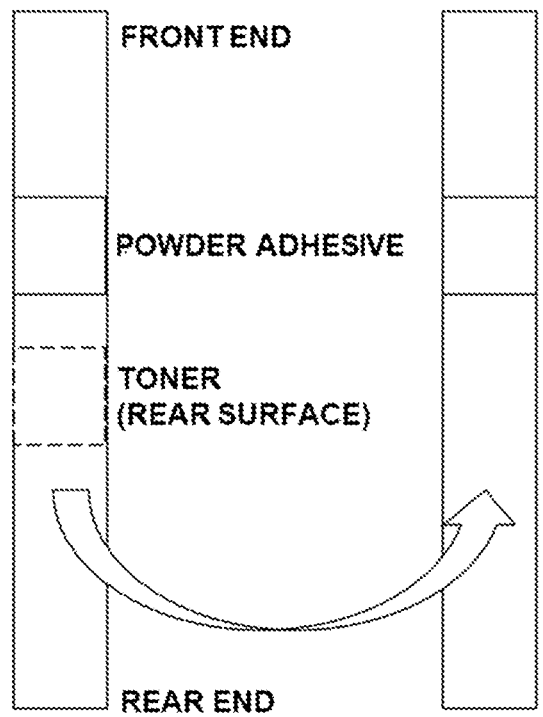
FIG. 10 is a schematic diagram of an evaluation sample.
Figure 10:
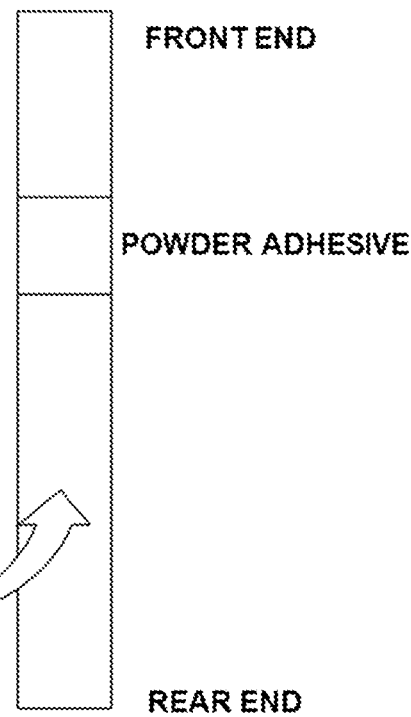
Figure 10:

As shown in FIG. 10, sample A and sample B were placed to face each other so that the powder adhesive surface was on the inner side, and the samples were passed through an external fixing unit removed from the LBP712Ci so that the sample A side was on the upper side to evaluate the adhesive strength of the powder adhesive and the hot offset resistance of the toner.

Specifically, a plurality of sets of sample A and sample B were prepared and passed through the fixing unit while changing the set temperature of the external fixing unit in 2° C. increments. In the adhesive strength evaluation method described hereinbelow, the minimum set temperature of the fixing unit at which the adhesive strength of the powder adhesive was 1.2 (N/cm²) was evaluated as the adhesive bonding temperature. The lower the bonding temperature, the better the adhesive strength at low temperature.

In addition, the maximum fixing unit set temperature at which hot offset of toner occurs was evaluated as the hot offset resistance temperature. The higher the hot offset resistance temperature, the better the hot offset resistance. The evaluation method of the hot offset property will be described hereinbelow.

In addition, the difference between the adhesive bonding temperature and the hot offset resistance offset temperature is taken as a fixing region, and the larger the fixing region, the greater the fixing margin and the better the developer set.

Evaluation of Adhesive Strength

Figure 11:
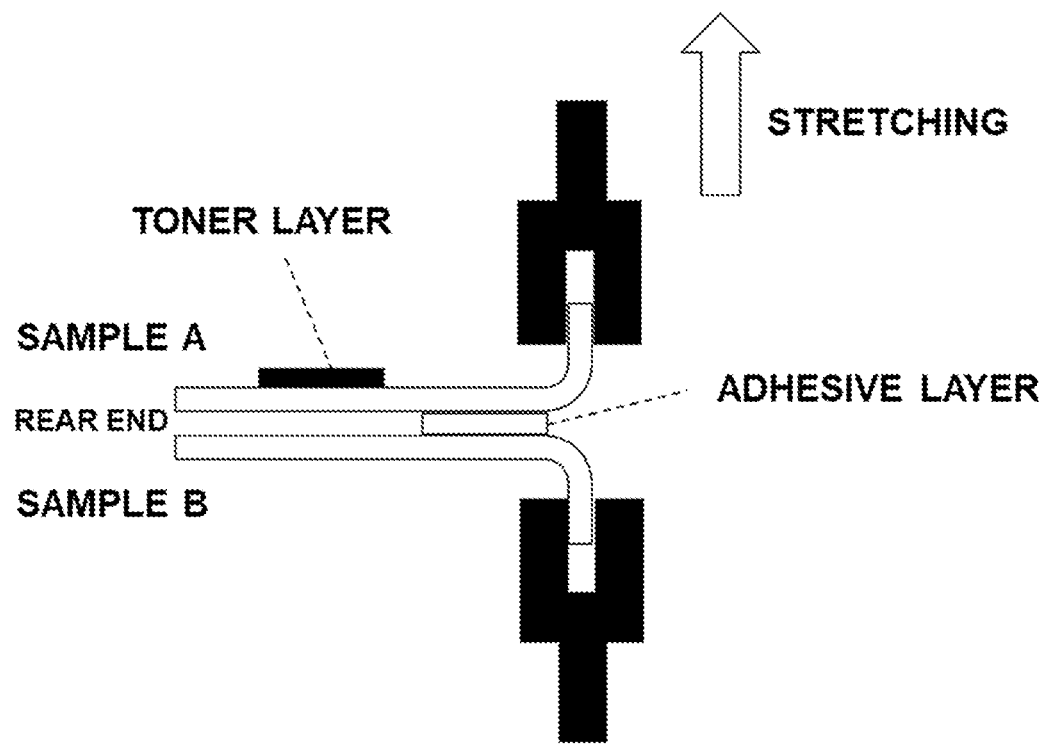
FIG. 11 is a schematic diagram of adhesive strength evaluation.

A Tencilon universal testing machine RTG-1225 (manufactured by A & D Co., Ltd.) was used to evaluate the adhesive strength. A parallel tightening type jaw was used as a jig, and the samples laminated as shown in FIG. 11 were set. A stress per 1 cm of width, which was obtained by multiplying the maximum value in a graph which was obtained when the evaluation sample image was peeled off under the condition of 50 mm/min and in which the distance (mm) was plotted against the abscissa and the stress (N/cm²) was plotted against the ordinate by ⅓, was defined as the adhesive strength (N/cm²). The larger this value, the better the adhesive strength. An adhesive strength of 1.2 (N/cm²), which could be determined to be sufficient, was taken as an evaluation standard.

Evaluation of Hot Offset

Where hot offset occurs when sample A and sample B are set to face each other so that the powder adhesive surface is on the inner side and the samples are passed through the fixing unit so that sample A side is on the upper side, the toner that has been hot offset downstream of the toner printing part of the paper is printed.

The concentration of toner derived from hot offset and printed on the paper was measured to evaluate the hot offset resistance. A reflectometer ("REFLECTOMETER MODEL TC-6DS" manufactured by Tokyo Denshoku Co., Ltd.) was used for measuring the concentration. The reflectance Dr (%) of the toner portion derived from the offset on the paper and the reflectance Ds (%) of the white background portion of the paper were measured, and calculation was performed using the following formula.

Toner concentration derived from hot offset(%)=$Dr$ (%)−$Ds$(%)

The maximum fixing unit set temperature at which this value did not exceed 0.4 was defined as the hot offset resistance temperature.

Evaluation of Wrinkles

The evaluation of the paper wrinkles in the adhesive portion was carried out at the hot offset resistance temperature at which wrinkles were likely to occur in the evaluation of the adhesive strength and the hot offset resistance. The number of wrinkles generated on paper on both sides of the adhesive portion was counted. The smaller the number of wrinkles, the better.

Evaluation of Curling

The sample passed through the fixing unit was allowed to stand at a temperature of 23° C. and a relative humidity of 50% for 24 hours to measure the curling amount of the sample. With reference to the ground plane of the sample, the height from the ground plane to the position farthest therefrom was measured with a ruler and evaluated as the curl height. The evaluation of curing was carried out at the hot offset resistance temperature at which curling was likely to occur in the evaluation of the adhesive strength and the hot offset resistance. The smaller the curl height, the better.

Evaluation of Exudation

A4 size CS-064 (64.0 g/m²) paper (manufactured by Canon Marketing Japan Inc.) was used for the evaluation of exudation.

Sample A and sample B were prepared using CS-064 by the same method as in the evaluation of adhesive strength and hot offset resistance. Subsequently, one sample that had passed through the fixing unit at a hot offset resistance temperature in the evaluation of adhesive strength and hot offset resistance was prepared as a condition under which exudation is likely to occur.

A4 size CS-064 paper with nothing printed thereon was cut to a width of 3 cm to prepare sample C. Sample C was placed on the surface of sample A that had passed through the fixing unit, and 500 sheets of CS-064 paper were further loaded on sample A and allowed to stand in an environment of 40° C./30% RH for 5 days. Then, the adhesive strength between sample A surface and sample C of the sample that had passed through the fixing unit was measured by the same method as in the above evaluation of adhesive strength. In this case, since the adhesive strength of the exuded powder adhesive is measured, the smaller the number, the better.

TABLE 10

|  |  | Bonding temperature of powder adhesive (° C.) | Hot offset resistance temperature of toner (° C.) | Fixing region (° C.) | Curling amount (mm) | Number of wrinkles | Adhesive strength determined by exudation (N/cm$^2$) |
|---|---|---|---|---|---|---|---|
| Example 1 | Developer set 1 | 192 | 230 | 38 | 0 | 0 | 0 |
| Example 2 | Developer set 2 | 186 | 230 | 44 | 0 | 0 | 0 |
| Example 3 | Developer set 3 | 188 | 230 | 42 | 0 | 0 | 0 |
| Example 4 | Developer set 4 | 194 | 230 | 36 | 0 | 0 | 0 |
| Example 5 | Developer set 5 | 192 | 230 | 38 | 0 | 0 | 0 |
| Example 6 | Developer set 6 | 192 | 230 | 38 | 0 | 0 | 0 |
| Example 7 | Developer set 7 | 198 | 230 | 32 | 0 | 0 | 0 |
| Example 8 | Developer set 8 | 192 | 230 | 38 | 0 | 0 | 0 |
| Example 9 | Developer set 9 | 192 | 230 | 38 | 0 | 0 | 0 |
| Example 10 | Developer set 10 | 192 | 230 | 38 | 4 | 0 | 0 |
| Example 11 | Developer set 11 | 192 | 230 | 38 | 2 | 0 | 0 |
| Example 12 | Developer set 12 | 192 | 230 | 38 | 2 | 0 | 0 |
| Example 13 | Developer set 13 | 192 | 230 | 38 | 2 | 0 | 0 |
| Example 14 | Developer set 14 | 196 | 230 | 34 | 2 | 0 | 0 |
| Example 15 | Developer set 15 | 192 | 230 | 38 | 2 | 0 | 0 |
| Example 16 | Developer set 16 | 192 | 230 | 38 | 2 | 0 | 0 |
| Example 17 | Developer set 17 | 192 | 230 | 38 | 2 | 0 | 0.1 |
| Example 18 | Developer set 18 | 192 | 230 | 38 | 2 | 1 | 0.2 |
| Example 19 | Developer set 19 | 194 | 230 | 36 | 2 | 0 | 0 |
| Example 20 | Developer set 20 | 198 | 230 | 32 | 2 | 0 | 0 |
| Example 21 | Developer set 21 | 192 | 230 | 38 | 2 | 2 | 0 |
| Example 22 | Developer set 22 | 192 | 230 | 38 | 2 | 3 | 0 |
| Example 23 | Developer set 23 | 192 | 226 | 34 | 2 | 0 | 0 |
| Example 24 | Developer set 24 | 192 | 224 | 32 | 2 | 0 | 0 |
| Example 25 | Developer set 25 | 192 | 222 | 30 | 2 | 0 | 0 |
| Example 26 | Developer set 26 | 192 | 220 | 28 | 2 | 0 | 0 |
| Example 27 | Developer set 27 | 200 | 226 | 26 | 2 | 0 | 0 |
| Example 28 | Developer set 28 | 202 | 226 | 24 | 2 | 0 | 0 |
| Example 29 | Developer set 29 | 206 | 230 | 24 | 2 | 0 | 0 |
| Example 30 | Developer set 30 | 208 | 230 | 22 | 5 | 3 | 0.3 |
| Comparative example 1 | Comparative developer set 1 | 214 | 232 | 18 | 2 | 0 | 0 |
| Comparative example 2 | Comparative developer set 2 | 224 | 234 | 8 | 2 | 0 | 0 |
| Comparative example 3 | Comparative developer set 3 | 218 | 242 | 24 | 2 | 0 | 0 |
| Comparative example 4 | Comparative developer set 4 | 192 | 204 | 12 | 2 | 0 | 0 |
| Comparative example 5 | Comparative developer set 5 | 228 | 246 | 18 | 2 | 1 | 0.2 |
| Comparative example 6 | Comparative developer set 6 | 226 | 244 | 18 | 2 | 0 | 0 |
| Comparative example 7 | Comparative developer set 7 | 228 | 246 | 18 | 2 | 5 | 0.2 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-130346, filed Jul. 31, 2020, which is hereby incorporated by reference herein in its entirety.

What is claimed is:

1. An electrophotographic developer set comprising:
   a toner; and
   a powder adhesive,
   wherein:
   the powder adhesive comprises:
      a crystalline polyester resin; and
      a thermoplastic resin other than the crystalline polyester resin;
   an amount of the crystalline polyester resin in the powder adhesive is 21% by mass or more;
   a melting point of the crystalline polyester resin is 55° C. to 100° C.; and
   in a viscoelasticity measurement,
   where Gt'(100) denotes a storage elastic modulus of the toner at 100° C. and Gb'(100) denotes a storage elastic modulus of the powder adhesive at 100° C.,
      Gb'(100) is $1.0 \times 10^5$ Pa or less; and
      Gt'(100)/Gb'(100) is 1.2 or more.

2. The electrophotographic developer set according to claim 1, wherein the Gt'(100)/Gb'(100) is 2.0 to 30.0.

3. The electrophotographic developer set according to claim 1, wherein
   in the viscoelasticity measurement,
   where Tb denotes the temperature at which the storage elastic modulus Gb' of the powder adhesive is $1.0 \times 10^4$ Pa, and
   Tt denotes the temperature at which the storage elastic modulus Gt' of the toner is $1.0 \times 10^4$ Pa,
   Tt–Tb is 10° C. or higher.

4. The electrophotographic developer set according to claim 1, wherein
   in the viscoelasticity measurement of the powder adhesive,
   a maximum value of the ratio (tan δ) of a loss elastic modulus G" of the powder adhesive to a storage elastic modulus G' of the powder adhesive at 55° C. to 100° C. is less than 3.0.

5. The electrophotographic developer set according to claim 1, wherein
   the crystalline polyester resin comprised in the powder adhesive is a polycondensation polymer of an aliphatic diol having 2 to 12 carbon atoms and an aliphatic dicarboxylic acid having 2 to 12 carbon atoms.

6. The electrophotographic developer set according to claim 1, wherein the thermoplastic resin comprised in the powder adhesive comprises a non-crystalline polyester resin as a main component.

7. The electrophotographic developer set according to claim 1, wherein the powder adhesive comprises a polyvalent metal compound, and the polyvalent metal compound is at least one selected from the group consisting of an aluminum compound, an iron compound, and a magnesium compound.

8. The electrophotographic developer set according to claim 1, wherein the powder adhesive has an average circularity of 0.940 or more.

9. The electrophotographic developer set according to claim 1, wherein:

the powder adhesive comprises an inorganic fine particle A on a surface thereof;

the inorganic fine particle A is a silica fine particle; and a primary particle of the inorganic fine particle A has a number average diameter of 30 nm to 200 nm.

10. The electrophotographic developer set according to claim 1, wherein the powder adhesive comprises a fine particle B on a surface thereof, and the fine particle B has a volume resistivity at 25° C. of $5.0 \times 10$ Ωm to $1.0 \times 10^8$ Ωm.

11. The electrophotographic developer set according to claim 1, wherein the toner comprises a crystalline polyester resin, and an amount of the crystalline polyester resin in the toner is smaller than the amount of the crystalline polyester resin in the powder adhesive.

12. The electrophotographic developer set according to claim 1, wherein the powder adhesive comprises a colorant, and an amount of the colorant in the powder adhesive is up to 1.00% by mass.

13. A method for producing a bonded product resulting from bonding at least one sheet of paper via an adhesive portion by using an electrophotographic developer set, wherein:

the electrophotographic developer set comprises:
 a toner; and
 a powder adhesive;
 the powder adhesive comprises:
  a crystalline polyester resin; and
  a thermoplastic resin other than the crystalline polyester resin;
 an amount of the crystalline polyester resin in the powder adhesive is 21% by mass or more;
 a melting point of the crystalline polyester resin is 55° C. to 100° C.; and
in a viscoelasticity measurement,
where Gt'(100) denotes a storage elastic modulus of the toner at 100° C. and Gb'(100) denotes a storage elastic modulus of the powder adhesive at 100° C.,
 Gb'(100) is $1.0 \times 10^5$ Pa or less and
 Gt'(100)/Gb'(100) is 1.2 or more, wherein
the bonded product has:
 a surface A on which an adhesive portion of the powder adhesive is fixed, and a surface B on which a toner image portion of the toner is fixed, the surface B being a surface different from the surface A, wherein
the method comprises, in no particular order:
forming the toner image portion on the surface B, and fixing the toner image portion on the surface B by heating; and
forming the adhesive portion on the surface A, and fixing the adhesive portion on the surface A by heating, and wherein
the method further comprises, after the forming and the fixing of the toner image portion and the adhesive portion:
overlaying the paper so as to interpose the adhesive portion; and
melting the adhesive portion thereby bonding the paper to obtain the bonded product.

* * * * *